US012768368B2

(12) United States Patent
Dai et al.

(10) Patent No.: US 12,768,368 B2
(45) Date of Patent: Oct. 20, 2026

(54) ELECTRIC FAN AND TERMINAL DEVICE

(71) Applicants: Guangdong Midea White Home Appliance Technology Innovation Center Co., Ltd., Foshan (CN); Midea Group Co., Ltd., Foshan (CN)

(72) Inventors: Longzhen Dai, Foshan (CN); Xiaowen Hu, Foshan (CN); Seyed Mostafa Moosaniaye Zare, Foshan (CN); Site Hu, Foshan (CN); Zhenjie Zeng, Foshan (CN)

(73) Assignees: GUANGDONG MIDEA WHITE HOME APPLIANCE TECHNOLOGY, Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 19/211,042

(22) Filed: May 16, 2025

(65) Prior Publication Data

US 2025/0277492 A1 Sep. 4, 2025

Related U.S. Application Data

(63) Continuation of application No. PCT/CN2023/108184, filed on Jul. 19, 2023.

(30) Foreign Application Priority Data

Nov. 22, 2022 (CN) ........................ 202211465831.7

(51) Int. Cl.
*F04D 29/44* (2006.01)
*F04D 17/16* (2006.01)
(Continued)

(52) U.S. Cl.
CPC ......... *F04D 29/444* (2013.01); *F04D 17/164* (2013.01); *F04D 17/165* (2013.01);
(Continued)

(58) Field of Classification Search
CPC .. F04D 29/444; F04D 29/5806; F04D 25/082; F04D 25/06; F04D 25/0606;
(Continued)

(56) References Cited

U.S. PATENT DOCUMENTS 3,245,610 A 4/1966 Sebok et al.
10,778,065 B2 * 9/2020 Bang ........................ H02K 1/28
(Continued)

FOREIGN PATENT DOCUMENTS

CN 201513313 U 6/2010
CN 108592267 A 9/2018
(Continued)

OTHER PUBLICATIONS

European Search Report, European Application No. 23893223.0, mailed Dec. 16, 2025 (8 pages).
(Continued)

*Primary Examiner* — Peter J Bertheaud
(74) *Attorney, Agent, or Firm* — Morgan, Lewis & Bockius LLP

(57) ABSTRACT

An electric fan includes a motor assembly, an impeller assembly, and a diffuser assembly. The motor assembly includes an output shaft, a bracket, and a stator-rotor component. The bracket and the stator-rotor component are both sleeved on the output shaft; the bracket has an accommodation region, and the stator-rotor component is disposed in the accommodation region. The impeller assembly is disposed on a side of the stator-rotor component and is sleeved on the output shaft; the diffuser assembly is sleeved on the
(Continued)

output shaft and is disposed between the stator-rotor component and the impeller assembly.

16 Claims, 12 Drawing Sheets

(51) Int. Cl.

| | |
|---|---|
| ***F04D 25/06*** | (2006.01) |
| ***F04D 25/08*** | (2006.01) |
| ***F04D 29/08*** | (2006.01) |
| ***F04D 29/28*** | (2006.01) |
| ***F04D 29/54*** | (2006.01) |
| ***F04D 29/58*** | (2006.01) |
| ***F04D 29/62*** | (2006.01) |
| ***H02K 7/00*** | (2006.01) |
| ***H02K 7/08*** | (2006.01) |
| ***H02K 7/14*** | (2006.01) |

(52) U.S. Cl.
CPC ......... *F04D 25/06* (2013.01); *F04D 25/0606* (2013.01); *F04D 25/082* (2013.01); *F04D 29/281* (2013.01); *F04D 29/5806* (2013.01); *F04D 29/624* (2013.01); *F04D 29/083* (2013.01); *F04D 29/541* (2013.01); *H02K 7/003* (2013.01); *H02K 7/08* (2013.01); *H02K 7/14* (2013.01)

(58) Field of Classification Search
CPC .... F04D 29/624; F04D 29/281; F04D 17/165; F04D 29/44
See application file for complete search history.

(56) References Cited

U.S. PATENT DOCUMENTS

| | | | | |
|---|---|---|---|---|
| 10,916,990 | B2 * | 2/2021 | Hwang | H02K 5/161 |
| 2019/0154054 | A1 | 5/2019 | Adachi | |
| 2019/0365167 | A1 | 12/2019 | Jung et al. | |
| 2022/0149674 | A1 * | 5/2022 | Jang | H02K 3/12 |

FOREIGN PATENT DOCUMENTS

| | | | |
|---|---|---|---|
| CN | 213906439 | U | 8/2021 |
| CN | 113775544 | A | 12/2021 |
| CN | 114688046 | A | 7/2022 |
| CN | 114718907 | A | 7/2022 |
| CN | 114776606 | A | 7/2022 |
| CN | 217354846 | U | 9/2022 |
| CN | 115681200 | A | 2/2023 |
| CN | 115681213 | A | 2/2023 |
| CN | 115788962 | A | 3/2023 |
| CN | 115898910 | A | 4/2023 |
| CN | 115898911 | A | 4/2023 |
| EP | 2940311 | A1 | 11/2015 |
| EP | 3306106 | A1 | 4/2018 |
| EP | 3376053 | A1 | 9/2018 |
| JP | 2018003806 | A | 1/2018 |
| KR | 20210012502 | A | 2/2021 |
| WO | 2021225229 | A1 | 11/2021 |

OTHER PUBLICATIONS

International Search Report and Written Opinion, International Application No. PCT/CN2023/108184, mailed Oct. 24, 2023 (17 pages).

Chinese First Office Action, Chinese Application No. 202211465831.7, mailed Apr. 24, 2026 (18 pages).

* cited by examiner

ELECTRIC FAN AND TERMINAL DEVICE

CROSS-REFERENCE TO RELATED APPLICATIONS

The present application is a continuation application of International (PCT) Patent Application No. PCT/CN2023/108184, filed on Jul. 19, 2023, which claims priority of Chinese Patent Application No. 202211465831.7, filed on Nov. 22, 2022, the entire contents of which are hereby incorporated by reference in their entirety.

TECHNICAL FIELD

The present disclosure relates to the technical field of electric fans, and in particular to an electric fan and a terminal device.

BACKGROUND

Electric fans are widely utilized in terminal devices such as vacuum cleaners. Typically, a conventional electric fan includes an impeller assembly, a diffuser, and a motor. The diffuser is disposed downstream of the impeller assembly and is sleeved outside the motor. During operation of the electric fan, airflow enters through the inlet of the impeller assembly. Driven by the motor, the impeller assembly accelerates the airflow, which then flows out of the outlet of the impeller assembly and into the diffuser, and finally out of the outlet of the diffuser and out of the electric fan.

SUMMARY OF THE DISCLOSURE

In a first aspect, the present disclosure provides an electric fan, including a motor assembly, an impeller assembly, and a diffuser assembly; where the motor assembly includes an output shaft, a bracket, and a stator-rotor component; the bracket and the stator-rotor component are both sleeved on the output shaft; the bracket has an accommodation region, and the stator-rotor component is disposed in the accommodation region; the impeller assembly is disposed on a side of the stator-rotor component and is sleeved on the output shaft; the diffuser assembly is sleeved on the output shaft and is disposed between the stator-rotor component and the impeller assembly; wherein a part of gas passing through the diffuser assembly is configured to flow toward an outside of the bracket, and another part of the gas is configured to flow toward an interior of the stator-rotor component.

In some embodiments, a gap is defined between the stator-rotor component and the diffuser assembly in an extension direction of an axis of the output shaft.

In some embodiments, the diffuser assembly has an air outlet on an end close to the stator-rotor component; in the extension direction of the axis of the output shaft, a positive projection of the air outlet at least partially overlaps with a positive projection of the stator-rotor component.

In some embodiments, the stator-rotor component includes a rotor and a stator; the rotor is sleeved on the output shaft, and the stator is sleeved outside the rotor; in the extension direction of the axis of the output shaft, a positive projection of the air outlet at least partially overlaps with a positive projection of the stator.

In some embodiments, in the extension direction of the axis of the output shaft, the positive projection of the air outlet is a first projection, and the positive projection of the stator is a second projection; an area where the first projection and the second projection overlap is greater than or equal to half an area of a small projection; the small projection is one of the first projection and the second projection, and the area of the small projection is less than an area of the other of the first projection and the second projection.

In some embodiments, the bracket includes a bracket body and a support member; the bracket body is sleeved on the output shaft; the support member is disposed on a side of the bracket body close to the diffuser assembly, and the support member is connected to the diffuser assembly and the bracket body, respectively.

In some embodiments, the motor assembly further includes a connecting member; the connecting member is sleeved on the output shaft and is disposed on a side of the support member away from the bracket body; the connecting member is disposed on a radial inner side of the diffuser assembly; the connecting member is connected to the support member and the diffuser assembly, respectively.

In some embodiments, the support member includes at least one support arm and a support connection; the at least one support arm is disposed on a side of the diffuser assembly close to the bracket body; the support connection is disposed on a side of the at least one support arm away from the diffuser assembly, and the support connection is connected to the at least one support arm and the bracket body, respectively.

In some embodiments, the at least one support arm is recessed toward the output shaft.

In some embodiments, the at least one support arm is a plurality of support arms, and the plurality of support arms are distributed at equal intervals along a circumferential direction of the output shaft.

In some embodiments, the motor assembly further includes a first bearing and a second bearing; the connecting member has a first bearing chamber, and the bracket body has a second bearing chamber; the first bearing and the second bearing are both sleeved on the output shaft, with the first bearing being disposed in the first bearing chamber and the second bearing being disposed in the second bearing chamber.

In some embodiments, the motor assembly further includes a plurality of elastic members; a first group of the plurality of elastic members is arranged between the first bearing and an inner wall of the first bearing chamber and respectively abuts against the first bearing and the first bearing chamber; a second group of the plurality of elastic members is arranged between the second bearing and an inner wall of the second bearing chamber and respectively abut against the second bearing and the second bearing chamber.

In some embodiments, the electric fan further includes a deflector, and a first end surface is formed on an end of the bracket adjacent to the diffuser assembly; the deflector is arranged on the first end surface; in the extension direction of the axis of the output shaft, a positive projection of the deflector at least partially overlaps with the positive projection of the air outlet.

In some embodiments, the deflector includes a deflection portion; the deflection portion protrudes toward the air outlet; in the extension direction of the axis of the output shaft, a positive projection of a point on the deflection portion furthest from the first end surface is disposed within the positive projection of the air outlet.

In some embodiments, a surface of the deflection portion close to the air outlet is curved.

In some embodiments, the electric fan further includes a mesh structure; the mesh structure covers a gap between the diffuser assembly and the stator-rotor component, and the mesh structure is connected to the diffuser assembly and the bracket, respectively.

In some embodiments, the impeller assembly includes an impeller assembly housing, a first impeller, a reflux component, and a second impeller; the first impeller, the reflux component, and the second impeller are disposed in the impeller assembly housing; the first impeller, the reflux component, and the second impeller are sequentially sleeved on the output shaft; a first flow channel is included in the first impeller, a reflux channel is formed between the reflux component and an inner wall of the impeller assembly housing, and a second flow channel is included in the second impeller; the first flow channel, the reflux channel, and the second flow channel in a sequential communication with each other.

In some embodiments, the impeller assembly further includes an elastic sealing ring, and the elastic sealing ring includes a sealing ring body and an elastic sealing tooth; each of the sealing ring body and the elastic sealing tooth has a ring-shaped structure, and both the sealing ring body and the elastic sealing tooth are sleeved on the output shaft; the sealing ring body is disposed between the reflux component and the elastic sealing tooth and is fixedly connected to the reflux component and the elastic sealing tooth, respectively; the elastic sealing tooth is rotatably connected to the output shaft; in the extension direction of the axis of the output shaft, a width of the elastic sealing tooth is positively correlated with a distance from the elastic sealing tooth to the axis of the output shaft.

In some embodiments, the impeller assembly further includes a sealing cotton; the sealing cotton is filled between the impeller assembly housing and the first impeller and/or between the impeller assembly housing and the second impeller.

In some embodiments, the diffuser assembly includes a first axial flow diffuser and a second axial flow diffuser; the first axial flow diffuser and the second axial flow diffuser are arranged along the extension direction of the axis of the output shaft; the first axial flow diffuser is sealed and connected to the second axial flow diffuser, and the first axial flow diffuser is in communication with the second axial flow diffuser; an end of the first axial flow diffuser away from the second axial flow diffuser is sealed and connected to the impeller assembly, and the first axial flow diffuser is in communication with the impeller assembly.

In a second aspect, the present disclosure provides a terminal device, including the electric fan as described in any of the first aspects and possible embodiments thereof.

In some embodiments, the terminal device is a vacuum cleaner.

It should be understood that the above general description and the detailed description below are only illustrative and explanatory, and do not limit the present disclosure.

BRIEF DESCRIPTION OF THE DRAWINGS

To more clearly illustrate the technical solution in the embodiments of the present disclosure, a brief description of the drawings needed for the description of the embodiments is provided below. Obviously, the drawings described below are only some examples of the present disclosure, and for those skilled in the art, other drawings may be obtained without the expenditure of creative effort.

Figure 1:
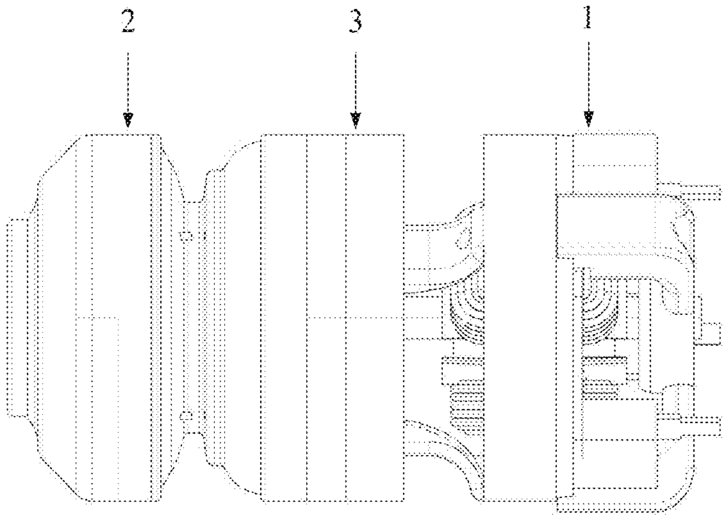
FIG. 1 is a structural schematic view of an electric fan according to some embodiments of the present disclosure.

Reference numerals: 1, motor assembly; 2, impeller assembly; 3. diffuser assembly; 4. deflector; 5. mesh structure; 11, output shaft; 12, bracket; 13, stator-rotor component; 14, connecting member; 15, first bearing; 16, second bearing; 17, elastic member; 18, electronic control board; 21, impeller assembly housing; 22, first impeller; 23, reflux component; 24, second impeller; 25, elastic sealing ring; 26, sealing cotton; 27, sealing bearing; 31, first axial flow diffuser; 32, second axial flow diffuser; 3A, air outlet; 41, deflection portion; 42, fixing portion; 43, connecting portion; 12A, accommodation region; 12B, first end surface; 14A, first bearing chamber; 14B, first mounting groove; 121, bracket body; 122, support member; 131, rotor; 132, stator; 211, first housing; 212, second housing; 231, partition plate; 232, reflux blade; 233, fixing protrusion; 251, sealing ring body; 252, elastic sealing tooth; 311, first diffuser impeller; 312, first diffuser housing; 321, second diffuser impeller; 322, second diffuser housing; 121A, second bearing chamber; 1221, support arm; 1222, support connection; 1211, body ring; 1212, connecting arm; 231A, mounting cavity; 251A, positioning protrusion; 3111, first inner shell; 3112, first diffuser blade; 3211, second inner shell; 3212, second diffuser blade; m, axis; O, first direction; 01, electric fan; 02, air intake apparatus; 03, dust collection chamber; 04, exhaust pipe.

DETAILED DESCRIPTION

Unless otherwise defined, technical or scientific terms mentioned in this text shall have the usual meaning understood by those skilled in the art. The use of the terms "first," "second," "third," and the like in the description and claims of the present disclosure does not imply any order, quantity, or importance, but is merely intended to distinguish different components. Similarly, the use of terms "a" or "an", etc. does not imply a limitation on the quantity, but rather that at least one exists. Terms such as "including" or "comprising" mean that the components or items preceding the word "including" or "comprising" cover the components or items listed after the word "including" or "comprising" and their equivalents, and do not exclude other components or items. Terms such as "connected" or "coupled" are not limited to physical or mechanical connections, but also include electrical connections, whether direct or indirect. Terms such as "above", "below", "left", and "right" are intended only to indicate relative positions. When the absolute position of the described object changes, the relative position may change accordingly.

To make the purpose, technical scheme, and advantages of the present disclosure clearer, the following will further describe in detail the implementation of the present disclosure in conjunction with the accompanying drawings.

An electric fan includes an impeller assembly, a diffuser assembly, and a motor assembly. Generally, the diffuser is disposed downstream of the impeller assembly and is sleeved outside the motor. During operation of the electric fan, airflow enters through the inlet of the impeller assembly. Driven by the motor, the impeller assembly accelerates the airflow, which then flows out of the outlet of the impeller assembly and into the diffuser, and finally out of the outlet of the diffuser and out of the electric fan.

However, during the operation of the electric fan, the motor, as a driving device, will release a large amount of heat energy. Since the diffuser is sleeved outside the motor, it affects the heat dissipation of the motor, which ultimately leads to poor operational reliability and a short service life of the electric fan. The present disclosure provides an electric fan that may solve the problem of poor heat dissipation of the motor assembly in the related art. The electric fan provided by the present disclosure is described below.

Figure 2:
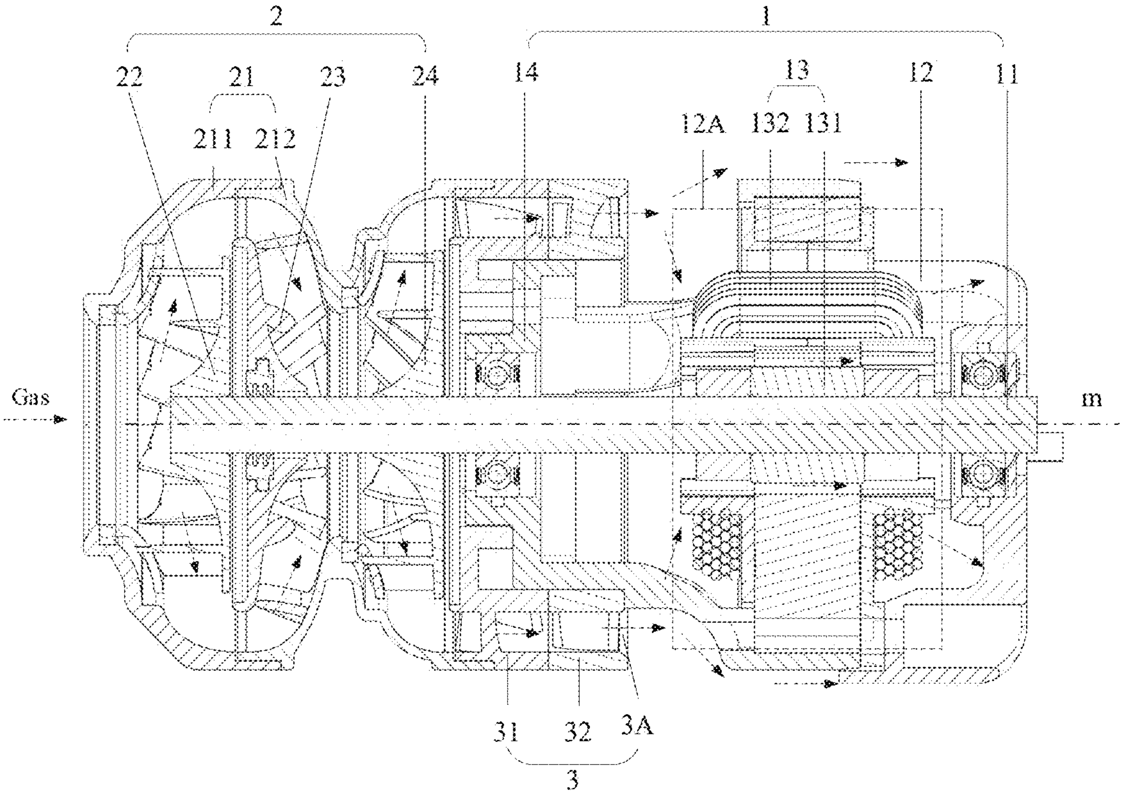
FIG. 2 is a cross-sectional structural schematic view of an electric fan according to some embodiments of the present disclosure.

FIG. 1 is a structural schematic view of an electric fan according to some embodiments of the present disclosure, and FIG. 2 is a cross-sectional structural schematic view of an electric fan according to some embodiments of the present disclosure. Referring to FIGS. 1 and 2, the electric fan includes a motor assembly 1, an impeller assembly 2, and a diffuser assembly 3, where the motor assembly 1 includes an output shaft 11, a bracket 12, and a stator-rotor component 13.

In the motor assembly 1, as shown in FIG. 2, the bracket 12 and the stator-rotor component 13 are both sleeved on the output shaft 11, and the bracket 12 and the stator-rotor component 13 are disposed on an end of the output shaft 11. The bracket 12 has an accommodation region 12A, the stator-rotor component 13 is arranged in the accommodation region 12A, and at least part of the stator-rotor component 13 is fixedly connected to the bracket 12.

As shown in FIG. 2, the impeller assembly 2 is disposed on a side of the stator-rotor component 13 and is sleeved on and connected to the output shaft 11.

As shown in FIG. 2, the diffuser assembly 3 is sleeved on the output shaft 11 and is disposed between the stator-rotor component 13 and the impeller assembly 2, and the diffuser assembly 3 is respectively connected to the bracket 12 and the impeller assembly 2. In other words, the diffuser assembly 3 is on the same side as the stator-rotor component 13.

During operation of the electric fan, the stator-rotor component 13 provides power, driving the output shaft 11 to cause the impeller assembly 2 to operate. Air is drawn in from a side of the impeller assembly 2 away from the diffuser assembly 3, is accelerated by the impeller assembly 2 and flows into the diffuser assembly 3, and flows out after being pressure-expanded by the diffuser assembly 3. The gas flowing out of the diffuser assembly 3 flows at least partially towards the stator-rotor component 13 and eventually flows out of the electric fan.

In the solutions provided by the present embodiments, the diffuser assembly 3 is disposed between the impeller assembly 2 and the stator-rotor component 13. During operation of the electric fan, the heat generated by the stator-rotor component 13 may be transferred to outside without being hindered by the diffuser assembly 3, which is beneficial to improving the heat dissipation effect of the stator-rotor component 13, thereby improving the reliability and service life of the motor assembly 1 during operation, and thus improving the reliability and service life of the entire electric fan.

The following provides a detailed description of various components of the electric fan provided in the embodiments of the present disclosure and a connection relationship between each component.

Figure 3:
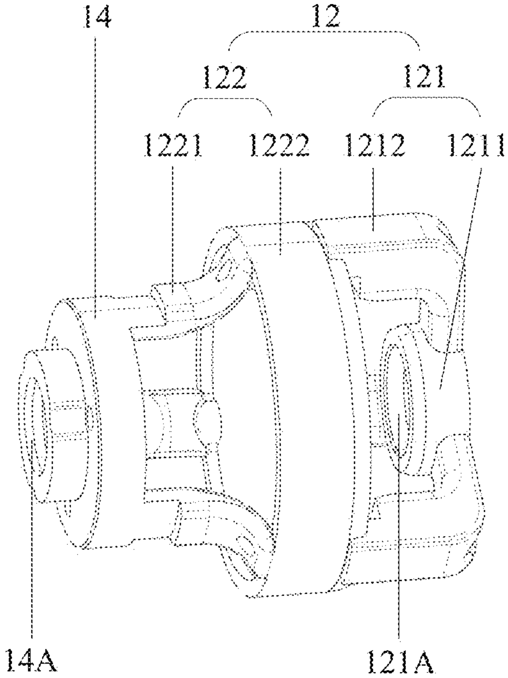
FIG. 3 is a structural schematic view of a bracket according to some embodiments of the present disclosure.

FIG. 3 is a structural schematic view of a bracket according to some embodiments of the present disclosure. As an example, with reference to FIGS. 2 and 3, the bracket 12 includes a bracket body 121 and a support member 122, and the bracket body 121 and the support member 122 form (or enclose to define) the accommodation region 12A.

The bracket body 121 is sleeved on the output shaft 11 and is rotatably connected to the output shaft 11, where the bracket body 121 may rotatably connected to the output shaft 11 by means of a bearing connection.

The support member 122 is disposed between the diffuser assembly 3 and the bracket body 121, e.g., the support member 122 is disposed on a side of the bracket body 121 facing the diffuser assembly 3, and the support member 122 is connected to the diffuser assembly 3 and the bracket body 121, respectively. The support member 122 and the bracket body 121 may be integrally formed, or they may be connected by welding, screwing, or bolting. The support member 122 and the diffuser assembly 3 may be connected to each other by means of a snap fit, welding, or bolting connection.

As an example, the support member 122 may be detachably connected to the bracket body 121, and the support member 122 may be detachably connected to the diffuser assembly 3, which may facilitate assembly and facilitate replacement and maintenance of components.

Figure 4:
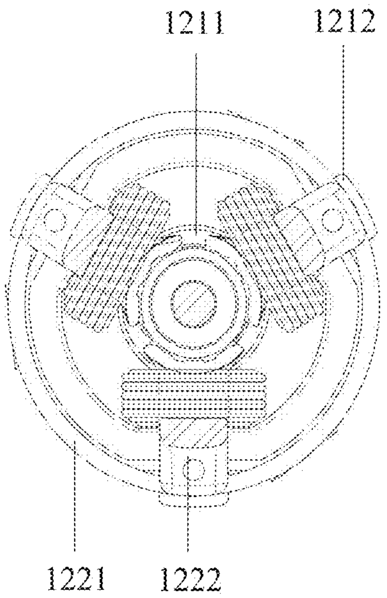
FIG. 4 is a schematic view of a positive projection of a partial structure of an electric fan according to some embodiments of the present disclosure.

In some embodiments, as shown in FIGS. 2 and 3, the bracket body 121 includes a body ring 1211 and at least one connecting arm 1212. The body ring 1211 is sleeved on the output shaft 11 and is rotatably connected to the output shaft 11, where the body ring 1211 and the output shaft 11 may be connected by a bearing connection. The at least one connecting arm 1212 is disposed on an outer wall of the body ring 1211 and is connected to the body ring 1211, where the connecting arm 1212 and the body ring 1211 may be integrally formed, or they may be fixed by a welding, hinging, plugging, or threading connection. As an example, as shown in FIG. 4, when a radial dimension of the body ring 1211 is significantly different from a radial dimension of a support connection 1222, the at least one connecting arm 1212 is bent towards the support member 122 on an end away from the body ring 1211, to ensure connection with the support member 122.

By virtue of this solution, it is possible to ensure that a relatively large blank region is left at the bracket body 121, e.g., a relatively large blank region is left on a side of the stator-rotor component 13 away from the diffuser assembly 3, such that gas may pass through the stator-rotor component 13 smoothly and dissipate heat from the stator-rotor component 13.

In some embodiments, in an extension direction of an axis m of the output shaft 11, a positive projection of the diffuser assembly 3 overlaps with a positive projection of the bracket 12. In this case, the gas flowing out of the diffuser assembly 3 may be more smoothly diverted, such that a portion of the gas flows by an outer wall of the bracket 12 and another portion of the gas flows by the interior of the stator-rotor component 13, which is conducive to improving the heat dissipation effect of the motor assembly 1. The positive projection of the diffuser assembly 3 represents a projection of the diffuser assembly 3 on a plane perpendicular to the axis m of the output shaft 11 in the extension direction of the axis m, and the positive projection of the bracket 12 represents a projection of the bracket 12 on a plane perpendicular to the axis m of the output shaft 11 in the extension direction of the axis m. The meaning of the term "positive projection" in the following is the same as or similar to the meaning of the positive projection mentioned herein and therefore will not be repeated.

In some embodiments, referring to FIGS. 2 and 3, the support member 122 includes at least one support arm 1221 and a support connection 1222. Each of the at least one support arm 1221 has a strip-shaped or plate-shaped structure, and the support arm 1221 has a small width to reduce the blockage of the gas flowing out of the diffuser assembly 3. The support connection 1222 has a ring-shaped structure, which may be a circular ring-shaped structure, i.e. a projection of the support connection 1222 on a cross-section perpendicular to the axis m of the output shaft 11 is a circular ring.

Referring to FIGS. 3 and 4, the at least one support arm 1221 is disposed on a side of the diffuser assembly 3 close to the bracket body 121, and each support arm 1221 is respectively connected to the diffuser assembly 3. The support connection 1222 is disposed on a side of the at least one support arm 1221 away from the diffuser assembly 3, and the support connection 1222 is respectively connected to the at least one support arm 1221 and the bracket body 121. In particular, the support connection 1222 and the support arm 1221 may be integrally formed, or they may be fixedly connected by welding or gluing; the support connection 1222 and the bracket body 121 may be integrally formed, or they may be connected by a welding, threaded, or bolt connection.

In some embodiments, the support member 122 may include only a single support arm 1221, such that the obstruction to the gas may be minimized.

In other embodiments, the support member 122 may include multiple support arms 1221, in which case the multiple support arms 1221 are distributed at equal intervals along a circumferential direction of the output shaft 11. When the support connection 1222 has a circular ring-shaped structure, the multiple support arms 1221 may be considered to be distributed at equal intervals around the circumference of the support connection 1222. This solution may be conducive to improving the stability and reliability of the electric fan after assembly. In some embodiments, the multiple support arms 1221 may be distributed at non-equal intervals along the circumferential direction of the output shaft 11.

As an example, FIG. 4 is a schematic view of a positive projection of a partial structure of an electric fan according to some embodiments of the present disclosure. referring to FIG. 4, in the extension direction of the axis m of the output shaft 11, a positive projection of the support arm 1221 overlaps with a positive projection of the connecting arm 1212. Specifically, a radial dimension of the support connection 1222 of the support member 122 is similar to a radial dimension of the bracket body 121, the number of support arms 1221 of the support member 122 is the same as the number of connecting arms 1212 of the bracket body 121, and the positive projection of the support arm 1221 overlaps with the positive projection of the connecting arm 1212 in the extension direction of the axis m of the output shaft 11.

This solution is advantageous in that it facilitates ensuring the coaxiality between the support member 122 and the bracket body 121 during assembly, thereby ensuring the reliability of the electric fan during operation; further, it is advantageous in that it reduces the overall blockage of the bracket 12 to the gas, minimizes the aerodynamic drag of the bracket 12, and allows more gas to pass through the interior of the stator-rotor component 13, thereby further enhancing the heat dissipation effect.

In some embodiments, the support member 122 may have a mesh structure or a shell structure. When the support member 122 has a mesh structure or a hollow shell structure (a shell with through holes), a portion of the gas blown out from the diffuser assembly 3 flows into the interior of the stator-rotor component 13, and the other portion of the gas may flow out of the support member 122 through the pores in the mesh structure. When the support member 122 is a sealed shell structure (e.g., a shell without through holes), all the gas flowing out of the diffuser assembly 3 flows to the stator-rotor component 13. No limitations are placed on the specific structure of the support member 122. The shape of the connecting arm 1212 is only required to ensure that the gas passing through the stator-rotor component 13 can flow outwards from the connecting arm 1212, such as a mesh structure or a hollow shell structure, without any limitations.

Referring to FIG. 2, a gap is defined between the stator-rotor component 13 and the diffuser assembly 3 in the extension direction of the axis m of the output shaft 11 (e.g., the axial direction of the output shaft 11). The gas flowing out of the diffuser assembly 3 diffuses in this gap, where a portion of the gas flows past the outer wall of the stator-rotor component 13, taking away the heat from the outer wall, and a portion of the gas flows past the interior of the stator-rotor component 13, taking away the heat from the interior, which is more conducive to improving the heat dissipation effect of the stator-rotor component 13, thereby further improving the operational reliability and service life of the entire electric fan. Moreover, the gap may slow down the gas flowing out of the diffuser assembly 3 to a certain extent, thereby reducing the noise generated by the gas impacting the stator-rotor component 13.

Referring to FIG. 2, the stator-rotor component 13 includes a rotor 131 and a stator 132. The rotor 131 is fixed to the output shaft 11 by means of an interference fit or a key connection, and the stator 132 is fixedly connected to an inner wall of the bracket 12. As an example, as shown in FIG. 2, the stator 132 is sleeved outside the rotor 131, and an air gap is defined between the stator 132 and the rotor 131. In this case, an inner wall of the stator 132 is opposite to an outer wall of the rotor 131. In the extension direction of the axis m of the output shaft 11, a positive projection of an air outlet 3A at least partially overlaps with a positive projection of the stator 132. This solution may allow the dimensions of the motor assembly 1 in the extension direction of the axis m of the output shaft 11, i.e. the axial dimensions of the motor assembly, to be controlled, thereby reducing the axial length of the electric fan.

In some embodiments, the stator 132 and the rotor 131 are both sleeved on the output shaft 11, and a gap is defined between the stator 132 and the output shaft 11. In the extension direction of the axis m of the output shaft 11, an air gap is defined between the stator 132 and the rotor 131, and an end surface of the stator 132 is opposite an end surface of the rotor 131. This solution is advantageous for reducing the radial dimensions of the electric fan.

In some embodiments, the diffuser assembly 3 has an air outlet 3A on an end close to the stator-rotor component 13, and the positive projection of the air outlet 3A in the extension direction of the axis m of the output shaft 11 at least partially overlaps with the positive projection of the stator-rotor component 13.

As an example, referring to FIG. 2, when the stator 132 is sleeved outside the rotor 131, the air outlet 3A is axially aligned with the stator 132. Specifically, in the extension direction of the axis m of the output shaft 11, the positive projection of the air outlet 3A is a first projection, and the positive projection of the stator 132 is a second projection. The area where the first projection and the second projection overlap is greater than or equal to half the area of the projection with a smaller area among the first projection and the second projection. For example, the area of the first projection is 10 $cm^2$, and the area of the second projection is 15 $cm^2$, it is necessary to ensure that the area where the first projection and the second projection overlap is greater than or equal to 5 $cm^2$. This solution is conducive to ensuring that the gas flowing out of the air outlet 3A of the diffuser assembly 3 diffuses into the interior of the stator-rotor component 13, thereby improving the heat dissipation effect on the stator-rotor component 13.

In some embodiments, a radial dimension of the diffuser assembly 3 is approximately equal to a radial dimension of the motor assembly 1. In this case, in the extension direction of the axis m of the output shaft 11, an outer contour of the positive projection of the air outlet 3A may coincide with an outer contour of the positive projection of the stator 132.

In some embodiments, referring to FIGS. 2 and 3, the motor assembly 1 further includes a connecting member 14. The connecting member 14 is sleeved on the output shaft 11 and is disposed on a side of the support arm 1221 away from the support connection 1222. The diffuser assembly 3 is sleeved on the connecting member 14 and is connected to the connecting member 14. In this case, the support arm 1221 is recessed toward the output shaft 11, and an end of the support arm 1221 away from the support connection 1222 is connected to the connecting member 14. This solution may reduce the occupation of the flow channel of the diffuser assembly 3, thereby reducing the blocking effect on the gas and improving the gas flow efficiency. Furthermore, the support arm 1221 has a curved shape, which may divert part of the gas flow to the outside of the bracket body 121, thereby improving the heat dissipation effect of the stator-rotor component.

In some embodiments, when the motor assembly 1 further includes the connecting member 14, the end of the support arm 1221 away from the support connection 1222 may be directly connected to the diffuser assembly 3. The connection relationship between the support arm 1221 and the diffuser assembly 3 is not limited in any way.

As an example, as shown in FIG. 4, when the support arm 1221 is recessed toward the output shaft 11 and connected to the connecting member 14, in the extension direction of the axis m of the output shaft 11, the positive projection of the support arm 1221 overlaps with the positive projection of the connecting arm 1212, thereby minimizing the aerodynamic drag of the bracket 12 and allowing more gas to pass through the interior of the stator-rotor component 13, and thus further improving the heat dissipation effect.

Figure 5:
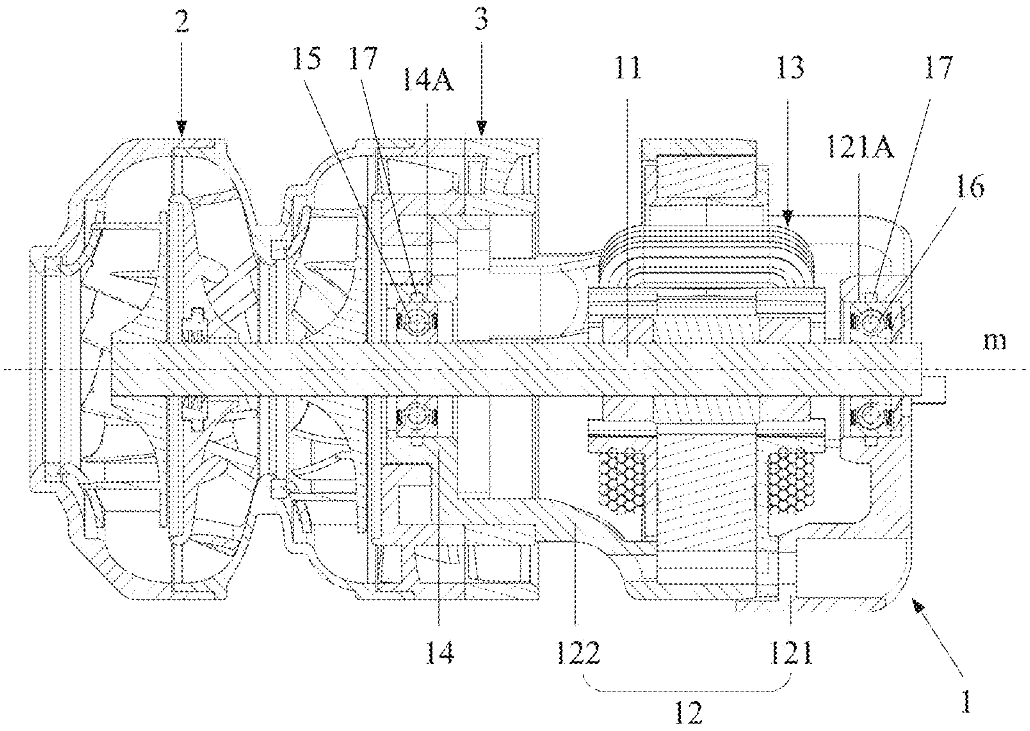
FIG. 5 is a cross-sectional structural schematic view of an electric fan according to some embodiments of the present disclosure.

FIG. 5 is a cross-sectional structural schematic view of an electric fan according to some embodiments of the present disclosure. In some embodiments, referring to FIGS. 3 and 5, the motor assembly 1 further includes a first bearing 15 and at least one elastic member 17, and the connecting member 14 has a first bearing chamber 14A. The output shaft 11 is disposed in the first bearing chamber 14A, and a gap is defined between the output shaft 11 and an inner wall of the first bearing chamber 14A. The first bearing 15 is sleeved on the output shaft 11 and is disposed in the first bearing chamber 14A, where the first bearing 15 and the output shaft 11 may be connected by a press fit or a key connection, and a gap is defined between the first bearing 15 and the inner wall of the first bearing chamber 14A. The at least one elastic member 17 is disposed between the first bearing 15 and the inner wall of the first bearing chamber 14A, and abuts against the first bearing 15 and the first bearing chamber 14A respectively to provide a preload force required for assembly of the first bearing 15. A gap may be defined between an outer wall of the first bearing 15 and the inner wall of the first bearing chamber 14A, or the outer wall of the first bearing 15 is in contact with the inner wall of the first bearing chamber 14A without generating an interaction force. As an example, the total preload force (i.e. total spring force, which refers to the sum of the spring forces provided by all elastic members 17 in a certain direction) that can be provided by the at least one elastic member 17 is in a range of 10 N to 20 N. The total spring force of the at least one elastic member 17 may be determined according to the preload force required for the bearing and output shaft to operate normally in actual products, which is not limited herein.

In the relevant art, the output shaft is fixedly connected to the bearing by means of a press fit or key connection, while the bearing is connected to the bearing chamber by a clearance fit. When the speed of the output shaft increases or when the length of the output shaft increases, the output shaft is prone to stress imbalance, excessive vibration, and serious deformation during high-speed rotation, which ultimately leads to product failure.

In the solutions provided in the present disclosure, the at least one elastic member 17 is arranged between the first bearing 15 and the first bearing chamber 14A, and the at least one elastic member 17 respectively abuts against the first bearing 15 and the inner wall of the first bearing chamber 14A, thereby providing a certain preload force for the first bearing 15. The preload force is conducive to ensuring the coaxiality between the first bearing 15 and relevant components during assembly. Furthermore, during the high-speed rotation of the output shaft 11, the at least one elastic member 17 may generate elastic force through deformation to reduce the deflection and vibration of the output shaft 11, thereby preventing stress imbalance, improving the vibration-reducing effect, which may thus help to prevent the output shaft 11 from failing and increase the service life of the product.

Figure 6:
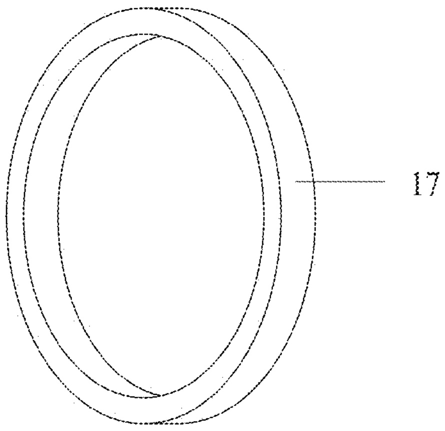
FIG. 6 is a structural schematic view of an elastic member according to some embodiments of the present disclosure.
Figure 7:
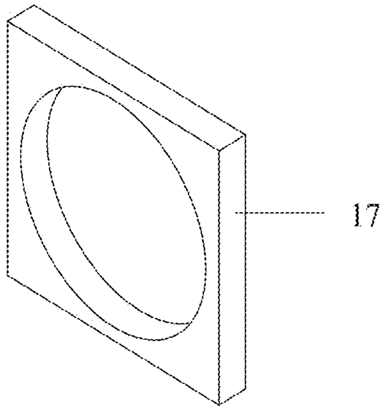
FIG. 7 is a structural schematic view of an elastic member according to some embodiments of the present disclosure.

FIG. 6 is a structural schematic view of an elastic member according to some embodiments of the present disclosure, and FIG. 7 is a structural schematic view of an elastic member according to some embodiments of the present disclosure. Referring to FIGS. 6 and 7, each elastic member 17 may have a ring-shaped structure. The elastic member 17 may be an O-shaped ring as shown in FIG. 6, or a square ring (with an inner circular surface and an outer square surface) as shown in FIG. 7. The elastic member 17 is sleeved outside the first bearing 15, and a surface of the elastic member 17 away from the first bearing 15 abuts against the inner wall of the first bearing chamber 14A. There are no limitations on the shape of the elastic member 17, as long as the elastic member 17 is sleeved outside the first bearing 15.

In some embodiments, the elastic member 17 may have a block structure, in which case the motor assembly 1 includes multiple elastic members 17, such as 3, 4, 8, etc. in number. The multiple elastic members 17 are distributed equally in a circumferential direction on the outer wall of the first bearing 15, and each elastic member 17 respectively abuts against the first bearing 15 and the first bearing chamber 14A to provide a corresponding preload force.

Figure 8:
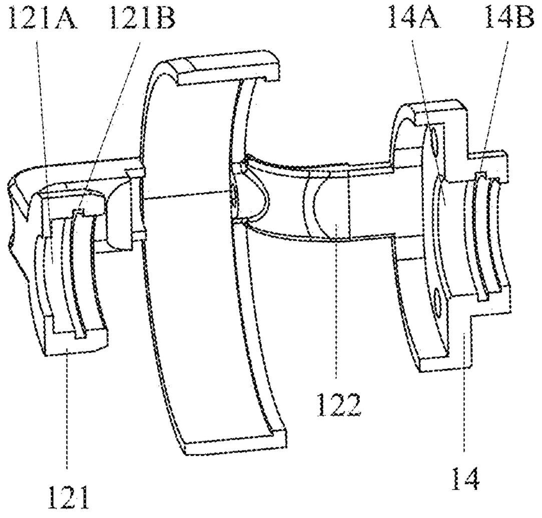
FIG. 8 is a structural schematic view of a bearing chamber according to some embodiments of the present disclosure.

FIG. 8 is a structural schematic view of a bearing chamber according to some embodiments of the present disclosure. In some embodiments, as shown in FIG. 8, the inner wall of the first bearing chamber 14A defines at least one first mounting groove 14B, and the number of the at least one first mounting groove 14B is equal to the number of the at least one elastic member 17. The at least one elastic member 17 is matched with the at least one first mounting groove 14B, and a portion of each elastic member 17 is disposed in a corresponding first mounting groove 14B. During assembly, the first bearing 15 squeezes the elastic member 17 to deform it, and a gap is defined between the outer wall of the first bearing 15 and the inner wall of the first bearing chamber 14A, or the outer wall of the first bearing 15 is in contact with the inner wall of the first bearing chamber 14A generating an interaction force (e.g., without friction).

As an example, when the elastic member 17 is an O-shaped ring, the first mounting groove 14B is an O-shaped ring groove, and each O-shaped ring is partially snapped in the first mounting groove 14B. Specifically, an outer wall arc of the O-shaped ring (e.g., the elastic member 17) fits a bottom arc of the O-shaped ring groove (e.g., the first mounting groove 14B), two end surfaces of the O-shaped ring fit two groove walls of the O-shaped ring groove, and an inner wall of the O-shaped ring protrudes from the first bearing chamber 14A toward the output shaft 11, e.g., a radial thickness of the O-shaped ring is greater than a depth of the O-shaped ring groove.

In some embodiments, when the elastic member 17 is a square ring as shown in FIG. 7, the first mounting groove 14B is a square ring groove matching the square ring. In this case, the assembly relationship between the square ring and the square ring groove is similar to the assembly relationship between the O-shaped ring and the O-shaped ring groove described above, which will not be described in detail here.

In some embodiments, when the elastic member 17 has a block structure, the first mounting groove 14B is a groove matching the block structure (e.g., the elastic member 17). In this case, the assembly relationship between the block structure and the groove is similar to the assembly relationship between the O-shaped ring and the O-shaped ring groove described above, which will not be described in detail here.

There are no limitations on the shape of the first bearing chamber 14A, as long as the first bearing chamber 14A matches the elastic member 17 and the surface the elastic member 17 away from the bottom of the first mounting groove 14B protrudes from the first bearing chamber 14A.

By virtue of this solution, at least part of the elastic member 17 is disposed in the first mounting groove 14B, which is advantageous for preventing the elastic member 17 from being displaced along the extension direction of the axis m of the output shaft 11 during high-speed rotation of the output shaft 11. Since the elastic member 17 abuts against the outer wall of the first bearing 15, a certain frictional force may be generated, such that, during high-speed rotation of the output shaft 11, it is advantageous to prevent the first bearing 15 from displacing along the extension direction of the axis m of the output shaft 11, thereby ensuring the working stability of the motor assembly 1 and the electric fan.

In some embodiments, the outer wall of the first bearing 15 defines at least one first bearing mounting groove, the number of the at least one first bearing mounting groove being equal to the number of the at least one elastic member 17. The at least one elastic member 17 is matched to the at least one first bearing mounting groove, and a portion of each elastic member 17 is disposed in a corresponding first bearing mounting groove.

For example, when the elastic member 17 is an O-shaped ring, the first bearing mounting groove is an O-shaped ring groove, and a portion of each O-shaped ring is snapped in the first bearing mounting groove. Specifically, an inner wall arc of the O-shaped ring (e.g., elastic member 17) fits a bottom arc of the O-shaped ring groove (e.g., first bearing mounting groove), two end surfaces of the O-shaped ring fit two groove walls of the O-shaped ring groove, and an outer wall of the O-shaped ring protrudes from the first bearing 15 in a direction away from output shaft 11, e.g., a radial thickness of the O-shaped ring is greater than a depth of the O-shaped ring groove. After assembly, a gap is defined between the outer wall of the first bearing 15 and the inner wall of the first bearing chamber 14A, or the outer wall of the first bearing 15 is in contact with the inner wall of the first bearing chamber 14A without generating an interaction force (e.g., without friction).

In cases where the elastic member 17 is a square ring or the elastic member 17 has a block structure, the assembly relationship between the elastic member 17 and the first bearing mounting groove is similar to the assembly relationship when the elastic member 17 is an O-shaped ring, which will not be described in detail here.

In some embodiments, taking the elastic member 17 as an O-shaped ring as an example, when a ratio of an axial length of the first bearing 15 to an outer diameter of the first bearing 15 is less than 0.5, the motor assembly 1 may include only one elastic member 17. The axial length of the first bearing 15 refers to a length of the first bearing 15 in the extension direction of the axis m of the output shaft 11, and may also be understood as a width of the first bearing 15. For example, when the axial length of the first bearing 15 is 3 mm and the outer diameter of the first bearing 15 is 12 mm, the motor assembly 1 may include only one O-shaped ring. For another example, when the axial length of the first bearing 15 is 6 mm and the outer diameter of the first bearing 15 is 12 mm, the motor assembly 1 may include two O-shaped rings.

As an example, the axial length of the first bearing 15 ranges from 3 mm to 6 mm, and the outer diameter of the first bearing 15 ranges from 12 mm to 16 mm. The dimensions of the first bearing 15 may be set according to the actual product requirements, which is not limited herein.

This solution is advantageous in that it may reasonably control the number of elastic members 17, preventing the occurrence of a situation in which the vibration-damping effect is reduced due to an excessive number of elastic members 17, and is further advantageous in that it may control costs and reduce assembly complexity. Herein, only an exemplary method for determining the number of elastic members 17 is provided, and no limitations are imposed on the method for determining the number of elastic members 17.

As an example, the elastic member 17 is made of a soft rubber material, such as nitrile rubber, silicone, polyethylene or polypropylene.

As an example, an axial length of the elastic member 17, that is, a thickness of the elastic member 17, ranges from 0.1 mm to 0.15 mm. The dimensions of the elastic member 17 may be set according to the actual product requirements, which is not limited herein.

As shown in FIGS. 3 and 5, the motor assembly 1 may further include a second bearing 16 and multiple elastic members 17, and the bracket 12 has a second bearing chamber 121A. Specifically, the body ring 1211 of the bracket body 121 of the bracket 12 has the second bearing chamber 121A. The output shaft 11 is disposed in the second bearing chamber 121A, and a gap is defined between an outer wall of the output shaft 11 and an inner wall or a surface of the second bearing chamber 121A. The second bearing 16 is sleeved on the output shaft 11 and is disposed in the second bearing chamber 121A. Some of the multiple elastic members 17 are arranged between the second bearing 16 and an inner wall of the second bearing chamber 121A, and these elastic members 17 respectively abut against the second bearing 16 and the second bearing chamber 121A to provide a preload force required for the assembly of the second bearing 16. A gap is defined between an outer wall of the second bearing 16 and the inner wall of the second bearing chamber 121A, or the outer wall of the second bearing 16 is in contact with the inner wall of the second bearing chamber 121A without generating an interaction force.

As an example, when each elastic member 17 is an O-shaped ring and the motor assembly 1 includes three O-shaped rings, two O-shaped rings are sleeved on the first bearing 15, the other O-shaped ring is sleeved on the second bearing 16; or, one O-shaped ring is sleeved on the first bearing 15, and the other two O-shaped rings are sleeved on the second bearing 16.

As an example, when each elastic member 17 has a block structure and the motor assembly 1 includes ten elastic members 17, five elastic members 17 are uniformly distributed along a circumferential direction of the outer wall of the first bearing 15, five elastic members 17 are uniformly distributed along a circumferential direction of the outer wall of the second bearing 16; or, four elastic members 17 are uniformly distributed along the circumferential direction of the outer wall of the first bearing 15, and six elastic members 17 are uniformly distributed along the circumferential direction of the outer wall of the second bearing 16.

In some embodiments, when a dimension of the first bearing 15 is the same as a dimension of the second bearing 16, a dimension of the elastic member 17 disposed on the outer wall of the first bearing 15 is the same as a dimension of the elastic member 17 disposed on the outer wall of the second bearing 16. In other embodiments, when the dimension of the second bearing 16 is different from the dimension of the second bearing 16, the dimension of the elastic member 17 disposed on the outer wall of the first bearing 15 is different from the dimension of the elastic member 17 disposed on the outer wall of the second bearing 16.

In some embodiments, referring to FIG. 8, the inner wall of the second bearing chamber 121A defines at least one second mounting groove 121B, the number of second mounting grooves 121B being equal to the number of the elastic members 17 arranged on the outer wall of the second bearing 16, and the second mounting grooves 121B being matched with the elastic members 17. The form structure of the second mounting groove 121B is the same as or similar to the form structure of the first mounting groove 14B, the assembly relationship between the second mounting groove 121B and the elastic member 17 is the same as or similar to the assembly relationship between the first mounting groove 14B and the elastic member 17, which will not be described in detail here.

In some embodiments, the outer wall of the second bearing 16 defines at least one second bearing mounting groove, the number of second bearing mounting grooves being equal to the number of the elastic members 17 arranged on the outer wall of the second bearing 16, and the second bearing mounting grooves being matched with the elastic members 17. The form structure of the second bearing mounting groove is the same as or similar to that of the first bearing mounting groove, and the assembly relationship between the second bearing mounting groove and the elastic member 17 is the same as or similar to that between the first bearing mounting groove and the elastic member 17, which will not be described in detail here.

Figure 9:
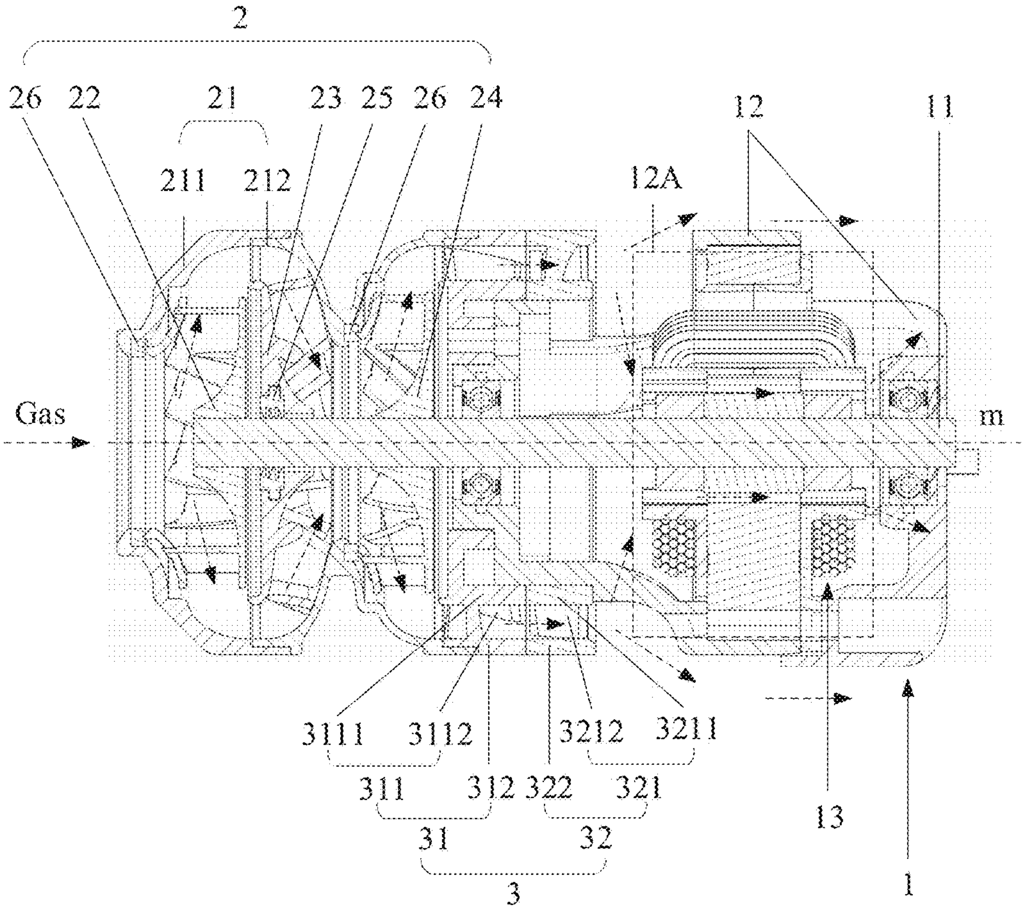
FIG. 9 is a cross-sectional structural schematic view of an electric fan according to some embodiments of the present disclosure.

FIG. 9 is a cross-sectional structural schematic view of an electric fan according to some embodiments of the present disclosure. As shown in FIG. 9, the impeller assembly 2 may include an impeller assembly housing 21, a first impeller 22, a reflux component 23, and a second impeller 24. The impeller assembly housing 21 is opened on both ends along the direction of the axis m, where the opening of the impeller assembly housing 21 away from the diffuser assembly 3 serves as an air inlet of the electric fan, and the opening of the impeller assembly housing 21 close to the diffuser assembly 3 is connected to the diffuser assembly 3. The impeller assembly housing 21 is sealed and connected to the diffuser assembly 3 to ensure that the air flow accelerated by the impeller assembly 2 flows entirely into the diffuser assembly 3.

As an example, as shown in FIG. 9, the first impeller 22, the reflux component 23 and the second impeller 24 are disposed in the impeller assembly housing 21. The first impeller 22, the reflux component 23, and the second impeller 24 are sequentially sleeved on the output shaft 11. The first impeller 22 or the second impeller 24 is fixedly connected to the output shaft 11, and the reflux component 23 is rotatably connected to the output shaft 11. Sealing cotton is filled between the first impeller 22 and the impeller assembly housing 21, and filled between the second impeller 24 and the impeller assembly housing 21. The sealing cotton may prevent gas from flowing out of a gap between the first impeller 22 and the impeller assembly housing 21 and a gap between the second impeller 24 and the impeller assembly housing 21, which is conducive to improving the efficiency of gas flow and thus the efficiency of the electric fan. There are no limitations on the connection of each of the first impeller 22, the reflux component 23, and the second impeller 24, with the output shaft 11.

As an example, as shown in FIG. 9, the first impeller 22 has a first flow channel, and the reflux component 23 and an inner wall of the impeller assembly housing 21 form a reflux channel. The second impeller 24 has a second flow channel, and the first flow channel, the reflux channel, and the second flow channel in a sequential communication. The gas enters the first flow channel through the air inlet of the electric fan (e.g., the opening of the impeller assembly housing 21 away from the diffuser assembly 3), is accelerated after passing through the first impeller 22, enters the reflux channel, enters the second flow channel after refluxing or diverting through the reflux component, is accelerated after passing through the second impeller, and enters the diffuser assembly 3.

In some embodiments, the impeller assembly 2 may include only one impeller or may include more than two impellers. In both cases, the impeller assembly 2 is similar to the above case with the first impeller 22 and the second impeller 24, which will not be described in detail herein.

In the related art, the diffuser assembly is sleeved on the motor assembly. In this case, the outer diameter of the electric fan is equivalent to the sum of the outer diameter of the motor assembly and the radial dimension of the diffuser assembly. However, in the embodiments of the present disclosure, which provides a multi-stage impeller, the radial dimension of the electric fan is equivalent to the radial dimension of the motor assembly or the radial dimension of the diffuser assembly. The electric fan in the proposed solutions has a smaller radial dimension compared to the electric fan in the related art, thereby facilitating product miniaturization. Moreover, the solution with the multi-stage impeller is conducive to improving the suction power of the electric fan to meet product development needs, and is conducive to reducing the radial dimension of the electric fan under the same suction power, thereby improving the applicability of the electric fan.

In some embodiments, as shown in FIG. 9, the impeller assembly housing 21 includes a first housing 211 and a second housing 212, the second housing 212 being disposed between the first housing 211 and the diffuser assembly 3 and being sealed and connected to the first housing 211 and the diffuser assembly 3, respectively. The second housing 212 and the first housing 211 may be detachably connected by welding, snap-fitting, etc. The first impeller 22 is disposed in the first housing 211, and the reflux component 23 and the second impeller 24 are disposed in the second housing 212. The specific positional relationship is similar to that described above, which will not be described in detail herein. The solution with a detachable connection between the first housing 211 and the second housing 212 is advantageous in that it may reduce the difficulty of assembling the impeller assembly 2, thereby improving production efficiency and facilitating subsequent maintenance.

In some embodiments, the first impeller 22 and the reflux component 23 are disposed in the first housing 211, and the second impeller 24 is disposed in the second housing 212. For this structure, it will not be repeated herein.

Figure 10:
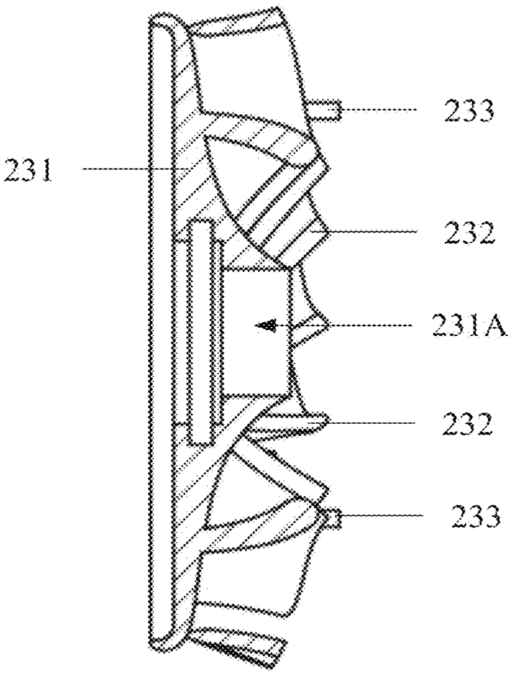
FIG. 10 is a structural schematic view of a reflux component according to some embodiments of the present disclosure.

FIG. 10 is a structural schematic view of a reflux component according to some embodiments of the present disclosure. Referring to FIGS. 9 and 10, the reflux component 23 includes a partition plate 231 and multiple reflux blades 232. The partition plate 231 is sleeved on the output shaft 11. The multiple reflux blades 232 are arranged on a side of the partition plate 231 close to the diffuser assembly 3, are unevenly distributed along the circumferential direction of the output shaft 11, and are connected to the partition plate 231. The reflux blades 232 and the partition plate 231 may be integrally formed, or they may be connected to each other by welding, gluing, or plugging, etc.

In some embodiments, as shown in FIG. 10, the reflux component 23 further includes multiple fixing protrusions 233. Each of the fixing protrusions 233 is disposed on a side of a corresponding reflux blade 232 away from the partition plate 231 and being connected to the corresponding reflux blade 232. An end of the fixing protrusion 233 away from the corresponding reflux blade 232 is fixedly connected to the impeller assembly housing 21 to ensure the stability of the partition plate 231 and the reflux blades 232. The number of the fixing protrusions 233 is less than the number of the reflux blades 232, for example, the number of the fixing protrusions 233 is 4, and the number of the reflux blades 232 is 16.

In some embodiments, the fixing protrusions 233 may be fixedly connected to the partition plate 231 and the impeller assembly housing 21, respectively, but not to the reflux blades 232. The number of the fixing protrusions 233 may be greater than or equal to the number of the reflux blades 232. No limitations are placed on the number and distribution of the fixing protrusions 233.

In some embodiments, as shown in FIG. 9, the impeller assembly 2 further includes an elastic sealing ring 25, and the partition plate 231 of the reflux component 23 defines a mounting cavity 231A. The elastic sealing ring 25 and the output shaft 11 are disposed in the mounting cavity 231A. The elastic sealing ring 25 is sleeved on the output shaft 11 and is disposed between the output shaft 11 and the reflux component 23. The elastic sealing ring 25 is fixedly connected to the reflux component 23 and rotatably connected to the output shaft 11.

Figure 11:
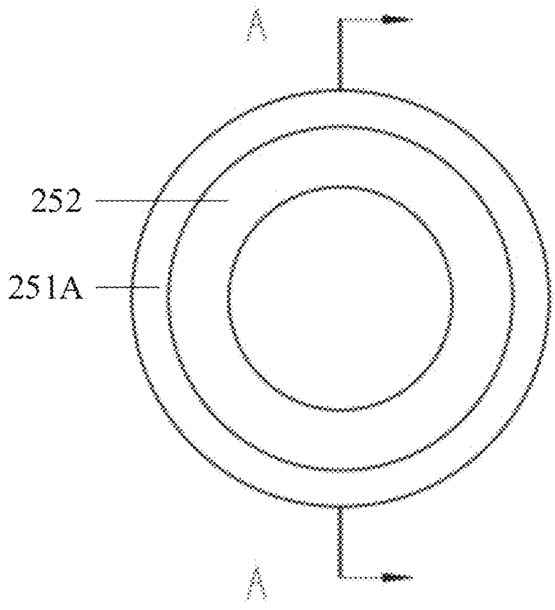
FIG. 11 is a structural schematic view of an elastic sealing ring according to some embodiments of the present disclosure.
Figure 12:
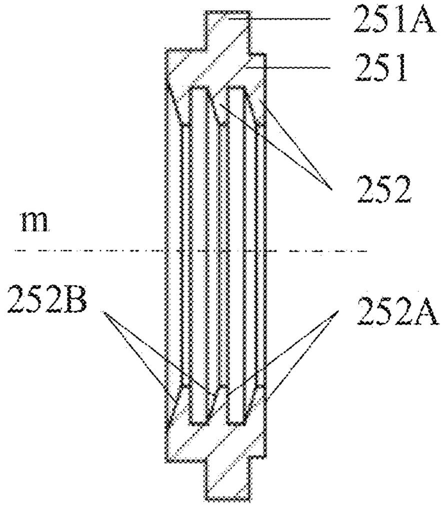
FIG. 12 is a cross-sectional schematic view of FIG. 11 along line A-A.

FIG. 11 is a structural schematic view of an elastic sealing ring according to some embodiments of the present disclosure, and FIG. 12 is a cross-sectional schematic view of FIG. 11 along line A-A. referring to FIGS. 9, 11, and 12, the elastic sealing ring 25 may include a sealing ring body 251 and an elastic sealing tooth 252. Each of the sealing ring body 251 and the elastic sealing tooth 252 has a ring-shaped structure, and both the sealing ring body 251 and the elastic sealing tooth 252 are sleeved on the output shaft 11. The sealing ring body 251 is disposed between the reflux component 23 and the elastic sealing tooth 252 and is fixedly connected to the reflux component 23 and the elastic sealing tooth 252, respectively. The elastic sealing tooth 252 is disposed between the sealing ring body 251 and the output shaft 11, and the elastic sealing tooth 252 is fixedly connected to the sealing ring body 251 while being rotatably connected to the output shaft 11.

The sealing ring body 251 may be fixedly connected to the reflux component 23 by welding, gluing, snap-fitting, or plug-fitting. The sealing ring body 251 and the reflux component 23 may be detachably connected to facilitate assembly between the sealing ring body 251 and the reflux component 23. Moreover, the detachable connection may facilitate the replacement of the elastic sealing ring 25 in the event of damage to the sealing ring body 251 or the elastic sealing tooth 252. The sealing ring body 251 and the elastic sealing tooth 252 may be integrally formed, or they may be fixedly connected by snap-fitting or gluing.

In some embodiments, the elastic sealing tooth 252 and the output shaft 11 may be fitted with a clearance to ensure that the position of the reflux component 23 in the impeller assembly 2 remains unchanged during high-speed rotation of the output shaft 11, i.e. the reflux component 23 does not rotate with the output shaft 11.

In some embodiments, the elastic sealing tooth 252 and the output shaft 11 may be connected by a bearing rotation. In this case, sealing rings are arranged on both ends of the bearing perpendicular to the axis m of the output shaft 11. The sealing rings seal the bearing, thereby preventing lubricant from overflowing from the bearing and further preventing gas in the reflux channel or the second flow channel from flowing back to the first flow channel through the bearing.

In some embodiments, any of the elastic sealing rings 25 provided by the embodiments of the present disclosure may be made of a soft rubber material, such as nitrile rubber, silicone rubber, polyethylene or polypropylene. The material of the elastic sealing ring 25 is only described here as an example and is not limited in any way. Moreover, the dimensions of the elastic sealing ring 25 may be determined according to the actual product requirements, which is not limited herein.

In some embodiments, referring to FIG. 9, the impeller assembly 2 may further include a sealing cotton 26. The sealing cotton 26 is arranged between the impeller assembly housing 21 and the first impeller 22 and/or between the impeller assembly housing 21 and the second impeller 24, thereby preventing the backflow of gas through the gap between the first impeller 22 and the impeller assembly housing 21 and the backflow of gas through the gap between the second impeller 24 and the impeller assembly housing 21. This solution may further improve the tightness of the impeller assembly 2, thereby further improving the operating efficiency of the electric fan.

Figure 13:
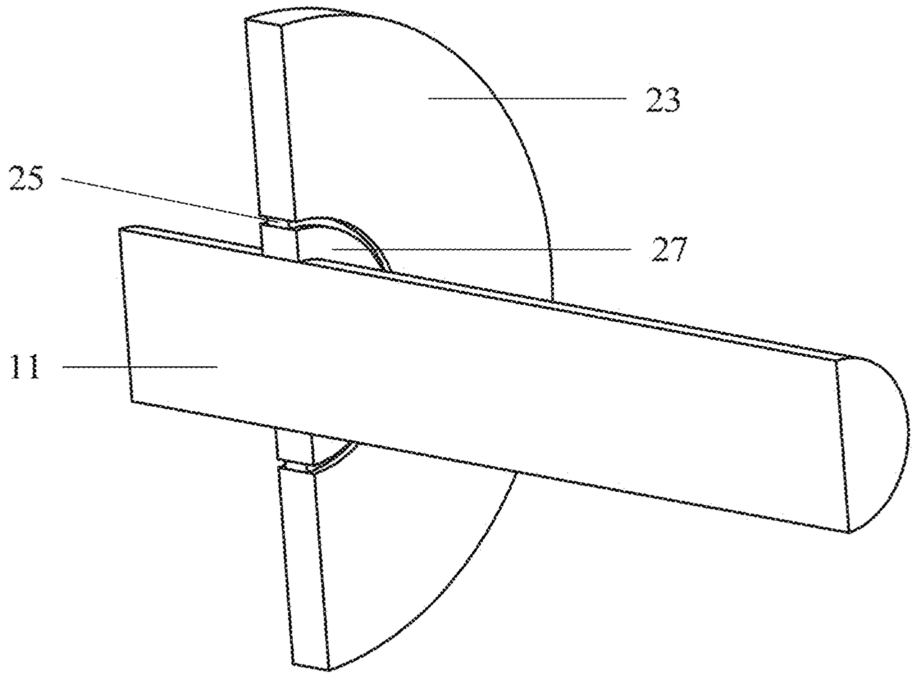
FIG. 13 is a partial structural schematic view of an electric fan according to some embodiments of the present disclosure.

FIG. 13 is a partial structural schematic view of an electric fan according to some embodiments of the present disclosure. As an example, as shown in FIG. 13, the impeller assembly 2 further includes a sealing bearing 27. The sealing bearing 27 is sleeved on the output shaft 11 and is disposed between the elastic sealing ring 25 and the output shaft 11. The seal bearing 27 is fixedly connected to the output shaft 11 and the elastic sealing ring 25, respectively. The seal bearing 27 may be connected to the output shaft 11 by means of a press fit or a key connection, and the seal bearing 27 may be connected to the elastic sealing ring 25 by means of a press fit, gluing, plugging, or welding. Sealing rings are arranged on both ends of the seal bearing 27 perpendicular to the axis m of the output shaft 11. The sealing rings seal the seal bearing 27, thereby preventing lubricant from overflowing from the seal bearing 27 and further preventing gas in the reflux channel or the second flow channel from flowing back to the first flow channel through the seal bearing 27.

This solution may ensure both a rotational connection between the reflux component 23 and the output shaft 11 and a good tightness between the reflux component 23 and the output shaft 11. In addition, the elastic sealing ring 25 may provide a certain vibration-reducing effect on the output shaft 11, thereby not only improving the working efficiency of the electric blower, but also improving the service life of the electric blower.

Figure 14:
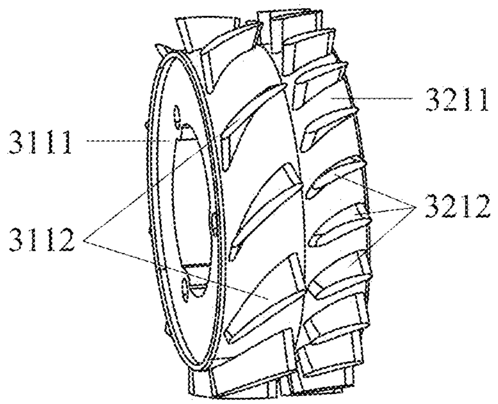
FIG. 14 is a partial structural schematic view of a diffuser assembly according to some embodiments of the present disclosure.

FIG. 14 is a partial structural schematic view of a diffuser assembly according to some embodiments of the present disclosure. Referring to FIGS. 9 and 14, the diffuser assembly 3 includes a first axial flow diffuser 31, the first axial flow diffuser 31 including a first diffuser impeller 311 and a first diffuser housing 312. The first diffuser impeller 311 includes a first inner shell 3111 and multiple first diffuser blades 3112.

Referring to FIGS. 9 and 14, the first inner shell 3111 may have a ring-shaped structure for being sleeved outside the output shaft 11. The first inner shell 3111 is disposed on a side of the impeller assembly 2 close to the stator-rotor component 13, and the first inner shell 3111 is sealed and connected to the impeller assembly 2. In particular, the first inner shell 3111 and the impeller assembly 2 may be connected to each other by welding. As an example, the first inner shell 3111 has a circular ring structure, e.g., the first inner shell 3111 has a circular ring shape in the radial cross-section, and there are no limitations on the cross-section shape of the ring structure.

Referring to FIGS. 9 and 14, taking the first inner shell 3111 with a circular annular structure as an example, the multiple first diffuser blades 3112 are distributed along a circumferential direction of an outer wall of the first inner shell 3111, and each first diffuser blade 3112 is connected to the first inner shell 3111. The first diffuser blade 3112 and the first inner shell 3111 may be integrally formed, or they may be connected by welding, snap-fitting, or gluing.

Referring to FIG. 9, the first diffuser housing 312 has a ring-shaped structure, and the first diffuser housing 312 is sleeved on the multiple first diffuser blades 3112. The first diffuser housing 312 and the multiple first diffuser blades 3112 may be sealed and connected by means of one-piece forming, welding or adhesive bonding, etc., or a certain installation gap may be left between the first diffuser housing 312 and the multiple first diffuser blades 3112. For example, a gap of 0.5 mm (or 0.2 mm, 1 mm, etc.) is defined between an inner wall of the first diffuser housing 312 and a surface of the first diffuser blade 3112 away from the first inner shell 3111. The first diffuser housing 312 is sealed to the impeller assembly 2 to prevent gas leakage.

In the first diffuser assembly 3, a first diffuser flow channel is formed between the first diffuser impeller 311 and the inner wall of the first diffuser housing 312, and the first diffuser flow channel is in communication with the flow channel in the impeller assembly 2. Since the first inner shell 3111 and the first diffuser housing 312 are respectively sealed and connected to the impeller assembly 2, during the operation of the electric fan, the gas first enters the flow channel in the impeller assembly 2, and after being accelerated by the impeller assembly 2, it flows into the first diffuser flow channel for primary pressure-expansion and deceleration treatment. By virtue of this solution, the electric fan may be ensured to operate normally and its work efficiency may be ensured.

The solutions provided in the embodiments of the present disclosure may be that in the first axial flow diffuser 31, the first diffuser blades 3112 are unevenly distributed along the circumferential direction of the outer wall of the first inner shell 3111. That is, in the first axial flow diffuser 31, the flow channel formed between two adjacent first diffuser blades 3112 has different sizes in the circumferential direction of the outer wall of the first inner shell 3111. Since the frequency of the gas flow is not the same in flow channels of different widths (i.e. different sizes), the pressure pulsations generated on both sides of the first diffuser blade 3112 do not superimpose on each other, and may even cancel each other out, which may help to reduce the noise generated by the diffuser assembly 3 and the operating noise of the electric fan during operation.

Referring to FIG. 9, the diffuser assembly 3 may further include a second axial flow diffuser 32, the second axial flow diffuser 32 including a second diffuser impeller 321 and a second diffuser housing 322. The second diffuser impeller 321 includes a second inner shell 3211 and multiple second diffuser blades 3212.

Referring to FIGS. 9 and 14, the second inner shell 3211 has a ring-shaped structure, and the second inner shell 3211 is sleeved on the output shaft 11. The second inner shell 3211 is disposed on a side of the first inner shell 3111 away from the impeller assembly 2 and is sealed and connected to the first inner shell 3111. The second inner shell 3211 and the first inner shell 3111 may be integrally formed, or they may be connected by means of a screw, welding, or riveting connection. In particular, the second inner shell 3211 and the first inner shell 3111 may be detachably connected, which is conducive to reducing the difficulty of assembling the diffuser assembly 3, thereby improving production efficiency and facilitating subsequent maintenance.

Referring to FIGS. 9 and 14, taking the second inner shell 3211 with a circular annular structure as an example, the multiple second diffuser blades 3212 are disposed on the outer wall of the second inner shell 3211 and distributed along a circumferential direction of the outer wall of the second inner shell 3211, and the multiple second diffuser blades 3212 are respectively connected to the second inner shell 3211. The second diffuser blade 3212 and the second diffuser blade 3212 may be integrally formed, or they may be connected by welding, snap-fitting, plug-in, or gluing.

Referring to FIG. 9, the second diffuser housing 322 has a ring-shaped structure, and the second diffuser housing 322 is sleeved on the multiple second diffuser blades 3212. The second diffuser housing 322 and the first diffuser housing 312 may be sealed and connected. The second diffuser housing 322 and the first diffuser housing 312 may be connected by threaded connection, welding, snap-fitting, etc., or they may be integrally formed. In particular, the first diffuser housing 312 and the second diffuser housing 322 may be connected in a detachable manner, which is conducive to reducing the difficulty of assembling the diffuser assembly 3, thereby improving production efficiency and also facilitating subsequent maintenance. The second diffuser housing 322 and the second diffuser blade 3212 may be fixedly connected by means of one-piece forming, welding, or gluing, or a gap may be left between the second diffuser housing 322 and the second diffuser blade 3212. For example, a gap of 0.5 mm (or 0.2 mm, 1 mm, etc.) is defined between an inner wall of the second diffuser housing 322 and a surface of the second diffuser blade 3212 away from the second inner shell 3211.

In the diffuser assembly 3, a second diffuser flow channel is formed between the second diffuser impeller 321 and the inner wall of the second diffuser housing 322, and the second diffuser flow channel is in communication with the first diffuser flow channel. During operation of the electric fan, the gas flows into the first diffuser flow channel first, undergoes the primary pressure-expansion and deceleration treatment, and then enters the second diffuser flow channel to undergo a secondary pressure-expansion and deceleration treatment. After undergoing the two pressure-expansion and deceleration treatments, the gas flows to the outside of the diffuser assembly 3.

In some embodiments, the diffuser assembly 3 may include more than two axial flow diffusers. The solution of using a multi-stage axial flow diffuser is more conducive to improving the pressure-expansion of the electric fan to meet product development needs. When the diffuser assembly 3 includes more than two axial flow diffusers, the two or more axial flow diffusers are coaxially arranged and connected in sequence, and it is only necessary to ensure that the blades in the adjacent two axial flow diffusers are distributed in a misaligned manner. The specific distribution method of the blades, as well as the connection relationship between the multiple axial flow diffusers, is similar to the above situation with the first axial flow diffuser 31 and the second axial flow diffuser 32, so it will not be described in detail herein.

The multi-stage axial flow diffuser may be advantageous for improving the pressure-expansion and deceleration capabilities of the electric fan to meet product development needs, and further advantageous for reducing the radial dimensions of the electric fan with the same pressure-expansion capability, thereby improving the applicability of the electric fan.

Figure 15:
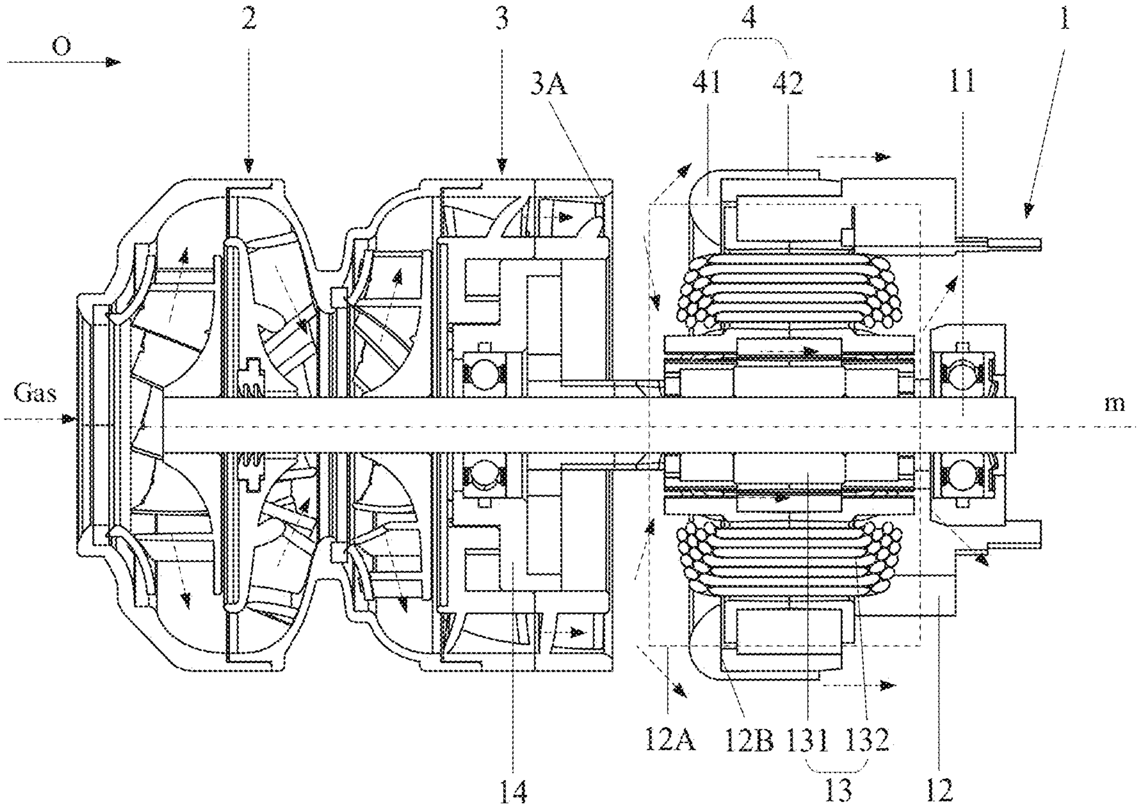
FIG. 15 is a cross-sectional structural schematic view of an electric fan according to some embodiments of the present disclosure.

FIG. 15 is a cross-sectional structural schematic view of an electric fan according to some embodiments of the present disclosure. Referring to FIG. 15, a first end surface 12B is formed on an end of the bracket 12 adjacent to the diffuser assembly 3, and a gap is defined between the air outlet 3A of the diffuser assembly 3 and the first end surface 12B in the extension direction of the axis m of the output shaft 11. A deflector 4 is arranged on the first end surface, e.g., the deflector 4 is disposed on and connected to the first end surface 12B of the bracket 12. Furthermore, at least a portion of the deflector 4 is opposite the air outlet 3A to adjust the flow direction of the gas exiting the air outlet 3A. In particular, at least a portion of the deflector 4 is opposite the air outlet 3A, and it may be considered that, in the extension direction of the axis m of the output shaft 11, a positive projection of the deflector 4 at least partially overlaps with a positive projection of the air outlet 3A.

In some embodiments, the positive projection of the deflector 4 completely overlaps with the positive projection of the air outlet 3A. In other embodiments, the positive projection of the deflector 4 is disposed within the positive projection of the air outlet 3A, i.e. the positive projection of the deflector 4 partially overlaps with the positive projection of the air outlet 3A. In other embodiments, the positive projection of the air outlet 3A is disposed within the positive projection of the deflector 4, i.e. the positive projection of the air outlet 3A partially overlaps with the positive projection of the deflector 4. In other embodiments, a portion of the positive projection of air outlet 3A overlaps with a portion of the positive projection of deflector 4.

In the related art, in an electric fan in which the motor is arranged downstream of the diffuser, the gas flowing out of the diffuser blows towards the motor approximately vertically, and after the gas flows impinges on the motor, it is forced to turn vertically and split, resulting in large aerodynamic losses. Moreover, the gas impinging on the motor generates large impact noise, thereby increasing the operating noise when the electric fan is in operation.

In the solutions provided in the embodiments of the present disclosure, the deflector 4 is arranged between the diffuser assembly 3 and the bracket 12, and at least a portion of the deflector 4 is opposite the air outlet 3A of the diffuser assembly 3. The deflector 4 can adjust the flow direction of the gas. Therefore, under the action of the deflector 4, the gas flowing out of the air outlet 3A of the diffuser assembly 3 is gradually guided to make turns and split flows, and will no longer blow vertically towards the first end surface 12B and the stator-rotor component 13 (e.g., will no longer blow vertically towards the motor assembly 1), which may be conducive to reducing the impact of the airflow on the motor assembly 1 to eliminate the impact noise generated by the impact of the airflow on the motor assembly 1, and furthermore, conducive to reducing the operating noise of the electric fan during operation.

Figure 16:
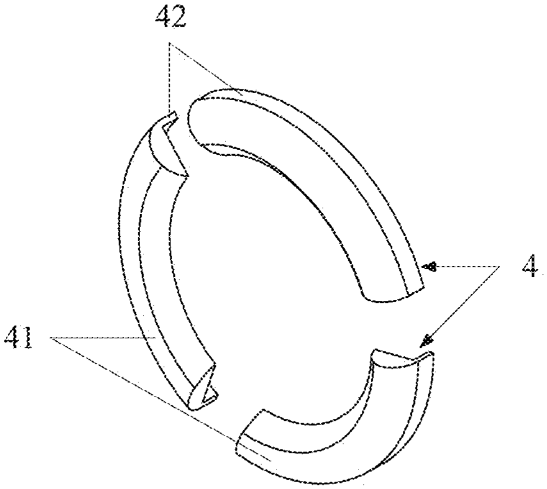
FIG. 16 is a structural schematic view of a deflector according to some embodiments of the present disclosure.

FIG. 16 is a structural schematic view of a deflector according to some embodiments of the present disclosure. Referring to FIGS. 15 and 16, the deflector 4 includes a deflection portion 41, and the deflection portion 41 is configured to adjust a flow direction of gas exiting the air outlet 3A. As an example, the deflection portion 41 is a raised structure, and the raised structure (e.g., the deflection portion 41) protrudes toward the air outlet 3A. In other words, in a first direction O, a radial width of the deflection portion 41 gradually decreases; where the first direction O is parallel to the extension direction of the axis m of the output shaft 11 and points from the first end surface 12B towards the air outlet 3A, and the radial width is a width of the deflection portion 41 perpendicular to the first direction O. In some embodiments, a point on the deflection portion 41 furthest from the first end surface 12B is opposite the air outlet 3A, e.g., in the extension direction of the axis m of the output shaft 11, a positive projection of the point on the deflection portion 41 furthest from the first end surface 12B is disposed within the positive projection of the air outlet 3A.

The closer a portion of the deflection portion 41 is to the air outlet 3A, the smaller the radial dimension of the portion is, i.e. the portion of the deflection portion 41 that is close to the air outlet 3A is more acute than another portion that is further away from the air outlet. In general, an acute part can produce a better air diversion effect. Therefore, this solution is conducive to improving the gas-diversion and-guidance effect of the deflection portion 41 of the deflector 4, thereby further reducing aerodynamic losses and reducing the operating noise of the electric fan.

As an example, when the radial width of the deflection portion 41 gradually decreases in the first direction O, it may be considered that two sides of the deflection portion 41 perpendicular to the first direction O are smooth surfaces, which may reduce wind resistance, thereby reducing aerodynamic losses when the airflow flows past both sides of the deflection portion 41 to improve gas flow efficiency.

In some embodiments, the point on the deflection portion 41 furthest from the first end surface 12B is disposed within the diffuser assembly 3 in the extension direction of the axis m of the output shaft 11, such that the diversion action is brought forward, thereby further reducing aerodynamic losses and improving gas flow efficiency. However, the greater the distance between the point on the deflection portion 41 furthest from the first end surface 12B and the diffuser assembly 3, the closer the point is to the impeller assembly 2, in which case the flow rate of the gas is faster, and the impact on the deflection portion 41 is greater. Although the gas flow efficiency may be improved, the impact of the gas on the deflection portion 41 is likely to increase the wear of the deflection portion 41 and generate some noise.

Therefore, in some embodiments, a gap is defined between the point on the deflection portion 41 furthest from the first end surface 12B and the air outlet 3A in the extension direction of the axis m of the output shaft 11. The gap may be determined according to the actual product requirements, for example, the gap may be half the distance between the first end surface 12B and the air outlet 3A. No limit is placed on the gap between the point on the deflection portion 41 furthest from the first end surface 12B and the air outlet 3A. By virtue of this solution, after the gas flows out of the air outlet 3A, it diffuses and slows down to a certain extent within this gap. The impact of the diffused and slowed down gas on the deflection portion 41 may be significantly reduced, which is beneficial for improving the efficiency of gas flow, reducing wear on the deflection portion 41, and reducing the noise generated by the gas impacting the deflection portion 41.

Referring to FIGS. 15 and 16, the deflection portion 41 protrudes towards the air outlet 3A, and a surface of the deflection portion 41 close to the air outlet 3A is curved. In other words, in a radial cross-section of the electric fan, the surface of the deflection portion 41 close to the air outlet 3A is a circular arc.

In some embodiments, the curved surface is an arc of equal radius, e.g., the radii corresponding to any point on the curved surface are equal. In this case, the radius of the curved surface may be considered to be the axial length of the deflection portion 41 in the extension direction of the axis m of the output shaft 11. In other words, in a radial cross-section of the electric fan, the circular arc formed by the surface of the deflection portion 41 close to the air outlet 3A is a semicircle.

As an example, when the stator 132 is sleeved outside the rotor 131, and the air outlet 3A is opposite the first end surface 12B and a portion of the stator 132, the radius of the curved surface may be equal to half the radial distance from an outer wall of a stator winding in the stator 132 to the outer wall of the bracket. In some embodiments, the radius of the curved surface may be equal to the radial dimension of the air outlet 3A, or equal to half the radial dimension of the deflection portion 41. No limitations are placed on the axial length of the deflection portion 41.

In other embodiments, the curved surface described above is a curved surface with a variable radius. As an example, referring to FIG. 15, the radius corresponding to any point on the curved surface is negatively correlated with the distance from any point to the axis m. In other words, in the radial cross-section of the electric fan, the arc formed by the surface of the deflection portion 41 close to the air outlet 3A is a variable radius arc; on the variable radius arc, the further away a point is from the axis m, the less the radius corresponding to the point, and the closer the point is to the axis m, the greater the radius corresponding to the point. In some embodiments, the radius corresponding to any point on the curved surface may be positively correlated with the distance from any point to the axis m.

As an example, when the stator 132 is sleeved outside the rotor 131, and the air outlet 3A is opposite to the first end surface 12B and a portion of the stator 132, an average radius of the curved surface with variable radius may be equal to half the radial distance between the outer wall of the stator winding in the stator 132 and the outer wall of the bracket, or it may be equal to the radial dimension of the air outlet 3A, or it may be equal to half the radial dimension of the deflection portion 41.

Figure 17:
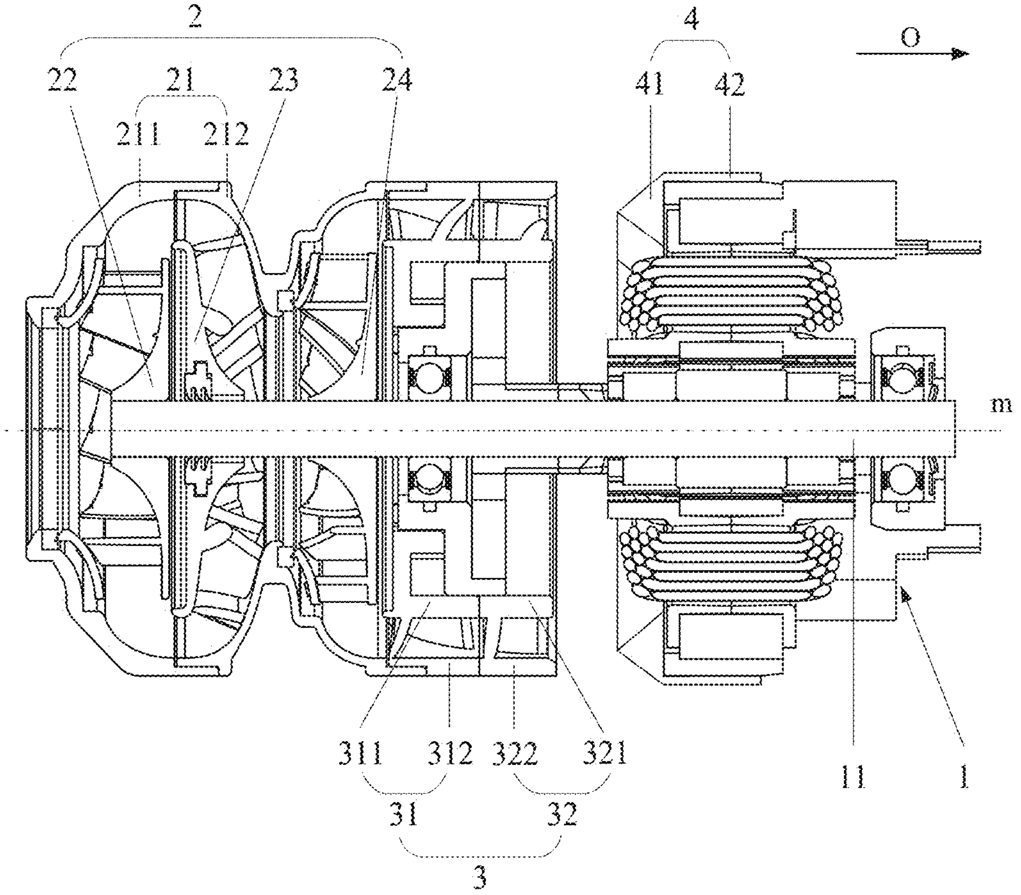
FIG. 17 is a cross-sectional structural schematic view of an electric fan according to some embodiments of the present disclosure.

FIG. 17 is a cross-sectional structural schematic view of an electric fan according to some embodiments of the present disclosure. As an example, as shown in FIG. 17, a radial cross-section of the deflection portion 41 is triangular, that is, the deflection portion 41 is triangular in the radial cross-section of the electric fan. As an example, the radial cross-section of the deflection portion 41 is an equilateral triangle, where the height of the equilateral triangle may be equal to half the radial distance between the outer wall of the stator winding in the stator 132 and the outer wall of the bracket, or it may be equal to the radial dimension of the air outlet 3A, or it may be equal to half the radial dimension of the deflection portion 41. When the radial cross-section of the deflection portion 41 is triangular, the shape and dimensions of the triangle may be determined according to the actual product requirements, which is not limited herein.

In some embodiments, referring to FIGS. 15 and 16, the deflector 4 may further include a fixing portion 42. The fixing portion 42 is disposed on a side of the deflection portion 41 away from the diffuser assembly 3 and is sleeved radially outside the bracket 12, where the radial direction of the bracket 12 is perpendicular to the direction of the axis m of the output shaft 11. The fixing portion 42 is connected to the flow guiding portion 41 and the bracket 12, respectively. The fixing portion 42 and the flow guiding portion 41 may be integrally formed, or they may be fixed by welding, riveting, or gluing, etc. The fixing portion 42 and the bracket 12 may be integrally formed, or they may be fixed by welding, snap-fitting, etc.

In some embodiments, the deflection portion 41 and the fixing portion 42 are integrally formed, and the fixing portion 42 is welded to the bracket 12. In this case, the deflection portion 41 and the bracket 12 may be fixedly connected or only in contact with each other without being connected.

In some embodiments, the deflection portion 41, the fixing portion 42, and the bracket 12 may be integrally formed, thereby facilitating the integration of components. No limitation is made here on the connection method between the deflection portion 41, the fixing portion 42, and the bracket 12.

Figure 18:
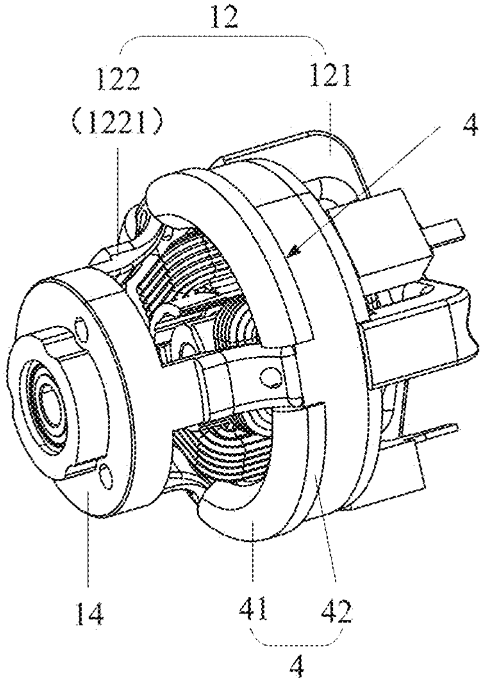
FIG. 18 is a partial structural schematic view of an electric fan according to some embodiments of the present disclosure.

FIG. 18 is a partial structural schematic view of an electric fan according to some embodiments of the present disclosure. Referring to FIGS. 15 and 18, when the support member 122 includes multiple support arms 1221, the electric fan may include multiple any one of the above-mentioned deflectors 4, and a deflector 4 is arranged between each adjacent two support arms 1221.

As an example, referring to FIG. 18, the multiple support arms 1221 are distributed at equal intervals along the circumferential direction of the output shaft 11, in which case the multiple deflection portions 4 are also distributed at equal intervals along the circumferential direction of the output shaft 11. In some embodiments, the multiple support arms 1221 may be distributed at non-equal intervals along the circumferential direction of the output shaft 11. In this case, it is only necessary to arrange the deflection portion 4 between each adjacent two support arms 1221. There are no limitations on the number and distribution of the deflection portions 4.

Figure 19:
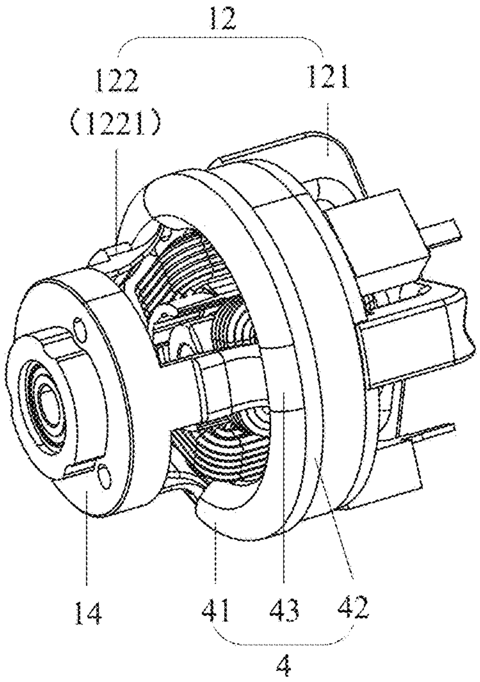
FIG. 19 is a partial structural schematic view of an electric fan according to some embodiments of the present disclosure.

FIG. 19 is a partial structural schematic view of an electric fan according to some embodiments of the present disclosure. As an example, as shown in FIG. 19, when the bracket 12 includes multiple support arms 1221, the deflector 4 may include multiple deflection portions 41 and one fixing portion 42. Each of the multiple deflection portions 41 is disposed between corresponding two adjacent support arms 1221 and connected to the fixing portion 42.

In some embodiments, the deflector 4 may include multiple connecting portions 43. As shown in FIG. 19, the connecting portions 43 correspond to the support arms 1221 in a one-to-one correspondence, and the connecting portion 43 is disposed on an outer side of the support arm 1221 and between corresponding two adjacent deflection portions 41. The connecting portion 43 may be connected to the deflection portion 41 and the fixing portion 42, respectively, to improve the strength and rigidity of the entire deflector 4. In some embodiments, the connecting portion 43 may further be connected to the support arm 1221, thereby improving the stability of the deflector 4 when mounted on the bracket 12.

In the solutions provided in the present embodiments, the deflector 4 is arranged between the diffuser assembly 3 and the bracket 12, and at least a portion of the deflector 4 is opposite the air outlet 3A of the diffuser assembly 3. The deflector 4 can adjust the direction of the gas flow, such that under the action of the deflector 4, the gas flowing out of the air outlet 3A of the diffuser assembly 3 is gradually guided to make turns and split flows, and will no longer blow vertically towards the first end surface 12B and the stator-rotor component 13 (e.g., will no longer blow vertically towards the motor assembly 1), which may be conducive to reducing the impact of the airflow on the motor assembly 1 to eliminate the impact noise generated by the impact of the airflow on the motor assembly 1, and furthermore, conducive to reducing the operating noise of the electric fan during operation.

Figure 20:
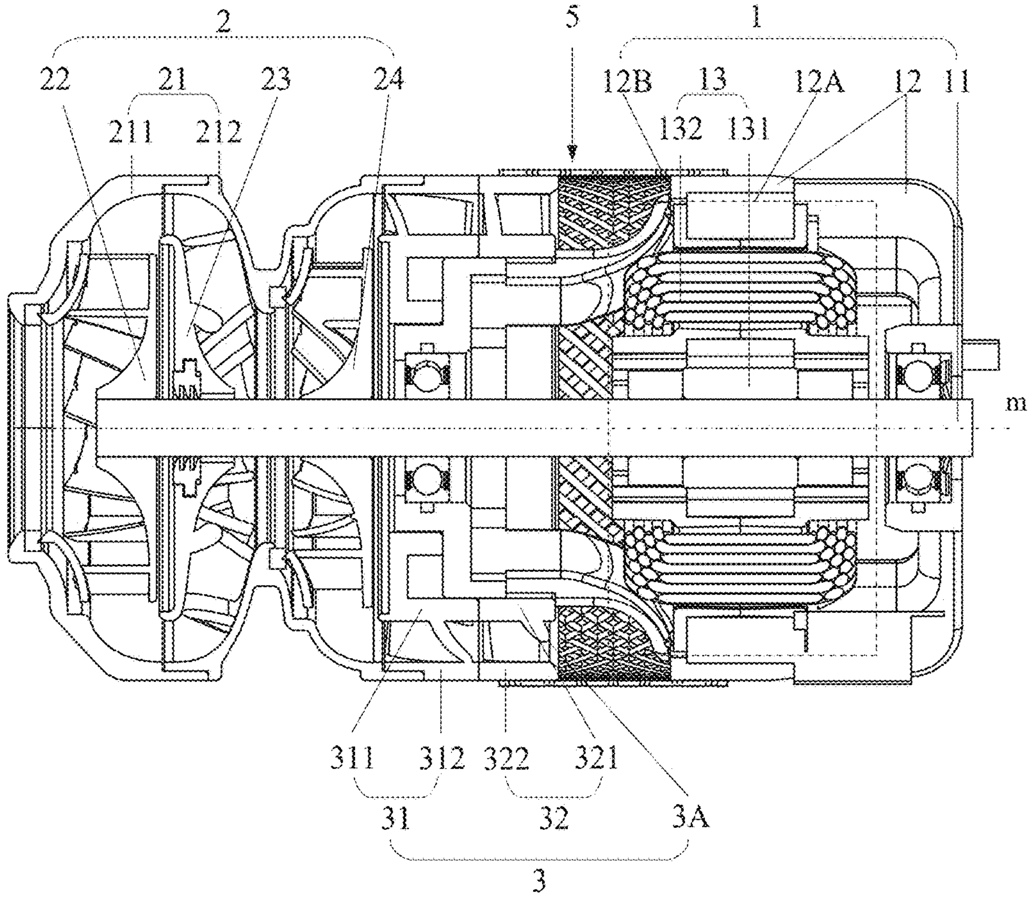
FIG. 20 is a cross-sectional structural schematic view of an electric fan according to some embodiments of the present disclosure.

FIG. 20 is a cross-sectional structural schematic view of an electric fan according to some embodiments of the present disclosure. Referring to FIG. 20, the electric fan may further include a mesh structure 5, which is disposed on a side of the diffuser assembly 3 away from the impeller assembly 2 and is connected to the diffuser assembly 3. The gas flowing out of the air outlet 3A of the diffuser assembly 3 encounters the mesh structure 5, and the flow rate and direction are adjusted under the action of the mesh structure 5. As an example, as shown in FIG. 20, the diffuser assembly 3 and the stator-rotor component 13 are spaced apart along the extension direction of the axis m of the output shaft 11. In this case, the mesh structure 5 covers the gap between the diffuser assembly 3 and the stator-rotor component 13, and the mesh structure 5 is respectively connected to the diffuser assembly 3 and the bracket 12.

The mesh structure 5 can adjust the flow rate distribution of the gas at the air outlet 3A of the diffuser assembly 3, such that the flow rate distribution of the gas at the air outlet 3A is uniform. Furthermore, the mesh structure 5 has an effect of slowing down and adjusting the flow direction of the gas, thereby reducing the impact of the gas on a surface of the motor or a surface of an electronic control board, thereby reducing or even eliminating impact noise, which may reduce the operating noise of the electric fan when in operation.

Figure 21:
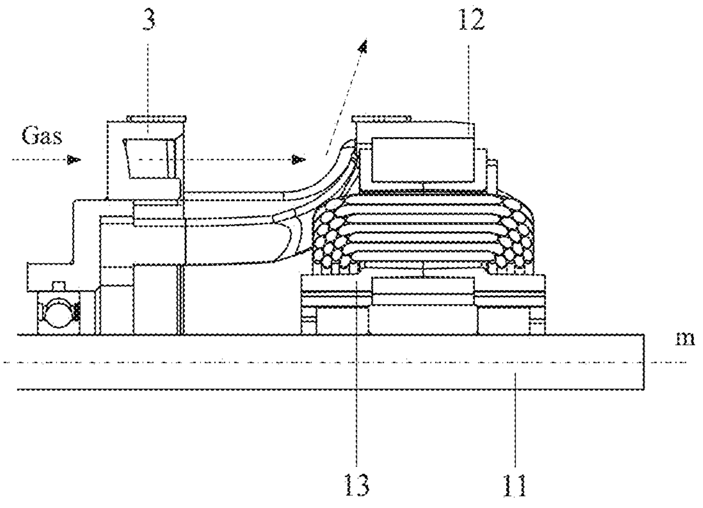
FIG. 21 is a schematic diagram of gas flow, when there is no mesh structure, according to some embodiments of the present disclosure.
Figure 22:
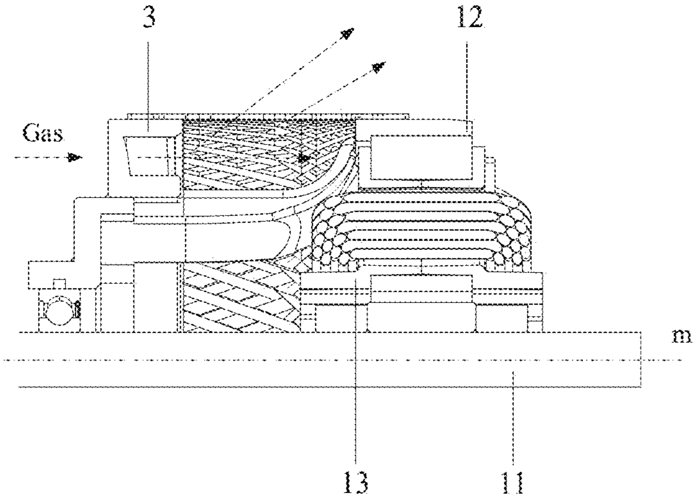
FIG. 22 is a schematic diagram of gas flow, when there is a mesh structure, according to some embodiments of the present disclosure.

FIG. 21 is a schematic diagram of gas flow, when there is no mesh structure, according to some embodiments of the present disclosure, and FIG. 22 is a schematic diagram of gas flow, when there is a mesh structure, according to some embodiments of the present disclosure.

As shown in FIG. 21, in an electric fan without the mesh structure 5, when the gap between the diffuser assembly 3 and the stator-rotor component 13 is equal to 6 mm, the gas flowing out of the air outlet 3A of the diffuser assembly 3 will impact the end surface of the stator-rotor component 13 at a high speed, and the gas will only spread to both sides (mainly to a side away from the output shaft 11) after reaching the end surface of the stator-rotor component 13. In this case, the bending angle of the gas flow during diffusion is greater than or equal to 60 degrees, or even up to 90 degrees.

As shown in FIG. 22, in an electric fan with the mesh structure 5, when the gap between the diffuser assembly 3 and the stator-rotor component 13 is equal to 6 mm, the gas flowing out of the air outlet 3A of the diffuser assembly 3 may be gradually decelerated under the action of the mesh structure 5, and under the action of the mesh structure 5, the gas will gradually spread to the side away from the output shaft 11 before reaching the end surface of the stator-rotor component 13. In this case, the bending angle of the gas flow during diffusion is less than or equal to 45 degrees.

In some embodiments, when the stator 132 is sleeved outside the rotor 131, the gap between the diffuser assembly 3 and the stator-rotor component 13 may be equal to or more than twice the radial thickness of the stator 132. In some embodiments, when the stator 132 and rotor 131 are coaxially arranged along the axis of the output shaft, the gap between the diffuser assembly 3 and the stator-rotor component 13 may be equal to the radius of the stator 132. The above is only some examples of the gap between the diffuser assembly 3 and the stator-rotor component 13. The gap between the diffuser assembly 3 and the stator-rotor component 13 may be set according to the gas flow rate discharged from the diffuser assembly 3 in the actual product, and no limit is imposed herein.

As can be seen in FIGS. 21 and 22, by virtue of the proposed solutions, the gas flowing out of the air outlet 3A of the diffuser assembly 3 may have its flow rate reduced before reaching the stator-rotor component 13 under the action of the mesh structure 5. Furthermore, the flow direction may be adjusted under the action of the mesh structure 5, thereby reducing the impact of the gas on the stator-rotor component 13 and thus reducing impact noise and the operating noise of the electric fan.

As an example, a length of the mesh structure 5 in the extension direction of the axis m of the output shaft 11 may be greater than the gap between the stator-rotor component 13 and the diffuser assembly 3. As shown in FIG. 20, two ends of the mesh structure 5 may respectively wrap around the outer wall of the diffuser assembly 3 and the outer wall of the bracket 12. The mesh structure 5 and the outer wall of the diffuser assembly 3 may be fixedly connected by welding, gluing, or riveting, and the mesh structure 5 and the outer wall of the bracket 12 may be fixedly connected by welding, gluing or riveting, thereby improving the stability of the mesh structure 5 in the electric fan. In some embodiments, the mesh structure 5 and the outer wall of the diffuser assembly 3 may be detachably connected by means of a snap fit, a plug-in connection or a threaded connection, and the mesh structure 5 and the outer wall of the bracket 12 may be detachably connected by means of a snap fit, a plug-in connection or a threaded connection, thereby facilitating the replacement of the mesh structure 5.

In some embodiments, an end of the mesh structure 5 is connected to an end surface where the air outlet 3A is disposed, and the other end of the mesh structure 5 wraps around the outer wall of the bracket 12. Or, an end of the mesh structure 5 wraps around the outer wall of the diffuser assembly 3, and the other end of the mesh structure 5 is connected to an end surface of the bracket 12 close to the diffuser assembly 3. Or, the two ends of the mesh structure 5 are respectively connected to the end surface where the air outlet 3A is disposed and the end surface of the bracket 12 close to the diffuser assembly 3.

Figure 23:
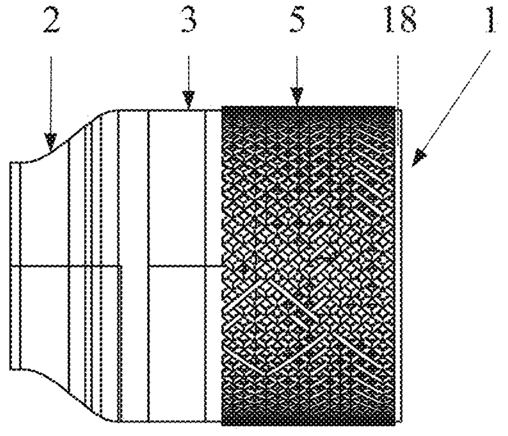
FIG. 23 is a structural schematic view of an electric fan according to some embodiments of the present disclosure.
Figure 24:
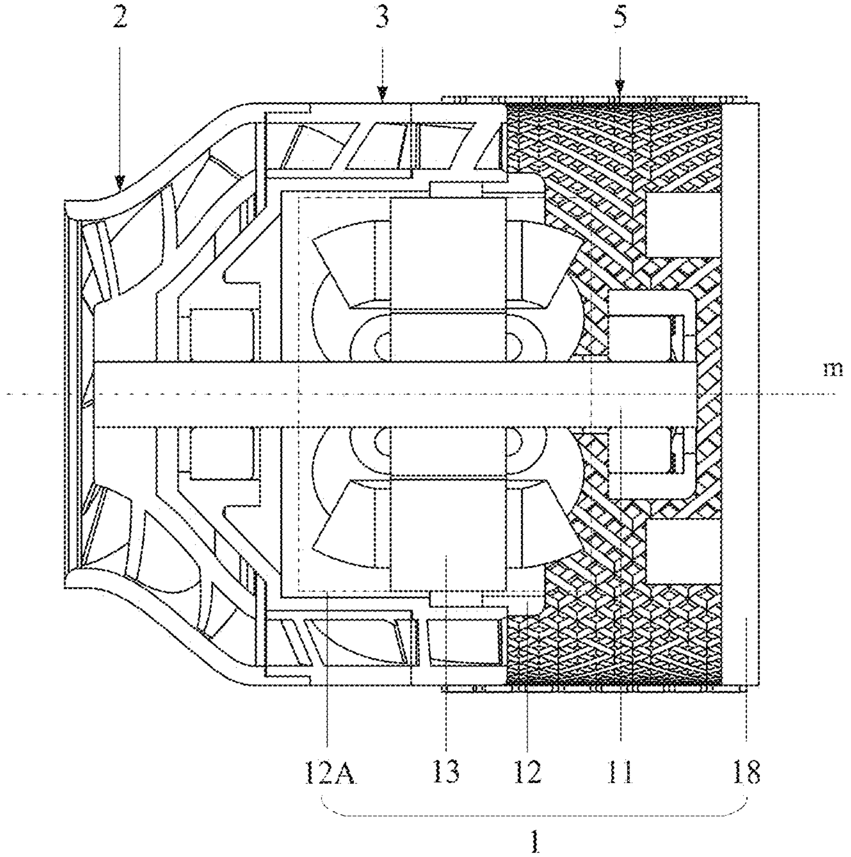
FIG. 24 is a cross-sectional structural schematic view of an electric fan according to some embodiments of the present disclosure.

FIG. 23 is a structural schematic view of an electric fan according to some embodiments of the present disclosure, and FIG. 24 is a cross-sectional structural schematic view of an electric fan according to some embodiments of the present disclosure. As an example, as shown in FIG. 24, the motor assembly 1 further includes an electronic control board 18. The stator-rotor component 13 is disposed on an inner side of the diffuser assembly 3, that is, the diffuser assembly 3 is sleeved on the bracket 12, and an inner wall of the diffuser assembly 3 is connected to the outer wall of the bracket 12. The electronic control board 18 is disposed on a side of the mesh structure 5 away from the diffuser assembly 3, the electronic control board 18 is opposite the air outlet 3A of the diffuser assembly 3, and the electronic control board 18 is respectively connected to the mesh structure 5 and the bracket 12. In other words, the electronic control board 18 is disposed on a side of the bracket 12 away from the impeller assembly 2, and a gap is defined between the air outlet 3A and the electronic control board 18 in the extension direction of the axis m of the output shaft 11. The mesh structure 5 covers the gap. The electronic control board 18 may further be electrically connected to the stator-rotor component 13 to control the rotation of the rotor 131 in the stator-rotor component 13, thereby driving the impeller in the impeller assembly 2.

When the stator 132 is sleeved outside the rotor 131, the gap between the diffuser assembly 3 and the electronic control board 18 may be equal to or greater than twice the radial thickness of the stator 132. In some embodiments, when the stator 132 and rotor 131 are arranged coaxially along the axis of the output shaft, the gap between the diffuser assembly 3 and the electronic control board 18 may be equal to the radius of the stator 132. The above is only some examples of the gap between the diffuser assembly 3 and the electronic control board 18. The gap between the diffuser assembly 3 and the electronic control board 18 may be set according to the gas flow rate discharged from the diffuser assembly 3 in the actual product, and no limit is imposed herein.

In the electric fan provided in the embodiments of the present disclosure, the diffuser assembly 3 is sleeved outside the bracket 12, and it may be considered that the diffuser assembly 3 is sleeved outside the entire motor assembly 1, which is conducive to reducing the length of the electric fan in the extension direction of the axis m of the output shaft 11. Moreover, the gas flowing out of the air outlet 3A of the diffuser assembly 3 may reduce the flow rate and adjust the flow direction under the action of the mesh structure 5 before reaching the electronic control board 18, thereby reducing the impact of the gas on the stator-rotor component 13, and thus reducing the impact noise and the operating noise of the electric fan.

Referring to FIGS. 20 and 24, the porosity of the mesh structure 5 provided in the embodiments of the present disclosure may range from 60% to 85%. In other words, on an outer wall of the mesh structure 5 (e.g., a surface of the mesh structure 5 away from the output shaft 11), the total area occupied by the through holes accounts for 60% to 85% of the total area of the outer wall of the mesh structure 5. No limit is imposed on the porosity of the mesh structure 5.

Figure 25:
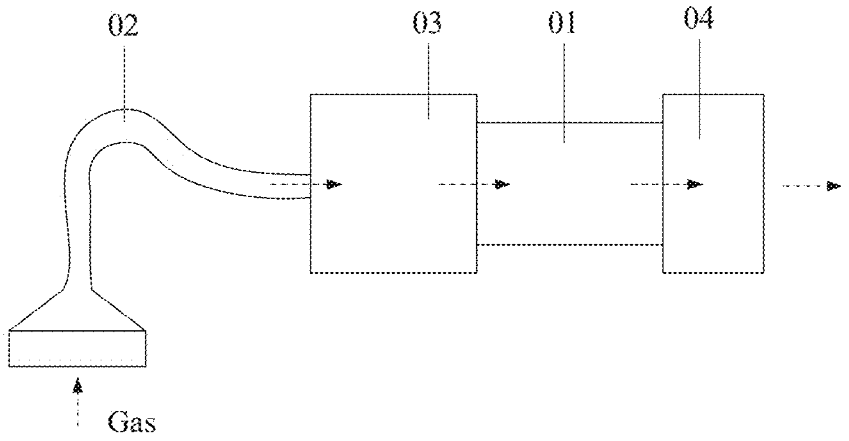
FIG. 25 is a structural schematic view of a terminal device according to some embodiments of the present disclosure.

Based on the same technical concept, the present disclosure provides a terminal device. FIG. 25 is a structural schematic view of a terminal device according to some embodiments of the present disclosure, and the terminal device includes any one of the electric fans 01 provided by the present disclosure. The terminal device may be a cleaning device, such as a vacuum cleaner or a sweeper.

As an example, the terminal device is a vacuum cleaner. Referring to FIG. 25, the vacuum cleaner may further include an air intake apparatus 02, a dust collection chamber 03, and an exhaust pipe 04. The air intake apparatus 02, the dust collection chamber 03, the electric fan 01, and the exhaust pipe 04 are connected in sequence, where an end of the air intake apparatus 02 away from the dust collection chamber 03 (e.g., an end of the air intake apparatus 02 not connected to the dust collection chamber 03) is connected to outside, and an end of the exhaust pipe 04 away from the electric fan 01 (e.g., an end of the exhaust pipe 04 not connected to the electric fan 01) is connected to outside.

When the vacuum cleaner is in operation, external air and target objects (e.g. dust, spilled water, dropped food, etc.) are sucked into the air intake apparatus 02 by the electric fan 01, and the target objects then enter the dust collection chamber 03 together with the air. The dust collection chamber 03 may be arranged with a filter apparatus, and the dust collection chamber 03 filters the target objects and air. The target objects are retained in the dust collection chamber 03, and the filtered gas enters the electric fan 01, is accelerated and pressure-expanded, and then flows out of the diffuser assembly 3. The outgoing gas passes through the outer surface and/or the interior of the stator-rotor component 13, taking away the heat generated by the stator-rotor component 13 and flowing to the exhaust pipe 04, and finally into the atmosphere. After the vacuum cleaner has completed the cleaning function on the target objects, the gas flowing out of the diffuser assembly 3 is fully utilized to dissipate heat from the stator-rotor component 13, which is beneficial to improving the heat dissipation effect of the stator-rotor component 13, thereby improving the work reliability and service life of the entire electric fan (and vacuum cleaner).

Moreover, in the relevant art, the radial dimension of the electric fan is affected by the diffuser assembly 3. Since the diffuser assembly 3 is sleeved outside the motor, the radial dimension of the entire electric fan is usually large. In the proposed solutions, the stator-rotor component 13 is disposed outside the diffuser assembly 3, which reduces the radial dimension of the diffuser assembly 3 and thus the radial dimension of the entire electric motor, which is conducive to the application of the electric motor in more products, thereby improving the applicability of the electric motor.

The above is only some implementations of the present disclosure and is not intended to limit the present disclosure. Any modifications, equivalent replacements, and improvements made within the spirit and principles of the present disclosure shall be included in the scope of the present disclosure.

What is claimed is:

1. An electric fan, comprising:

a motor assembly;

an impeller assembly; and a diffuser assembly, wherein the motor assembly comprises an output shaft, a bracket, and a stator-rotor component;

the bracket and the stator-rotor component are both sleeved on the output shaft; the bracket has an accommodation region, and the stator-rotor component is disposed in the accommodation region;

the impeller assembly is disposed on a side of the stator-rotor component and is sleeved on the output shaft;

the diffuser assembly is sleeved on the output shaft and is disposed between the stator-rotor component and the impeller assembly; and wherein a part of gas passing through the diffuser assembly is configured to flow toward an outside of the bracket, and another part of the gas is configured to flow toward an interior of the stator-rotor component;

wherein the bracket comprises a bracket body and a support member; the bracket body is sleeved on the output shaft; the support member is disposed on a side of the bracket body close to the diffuser assembly, and the support member is connected to the diffuser assembly and the bracket body, respectively;

wherein the motor assembly further comprises a connecting member; the connecting member is sleeved on the output shaft and is disposed on a side of the support member away from the bracket body; the connecting member is disposed on a radial inner side of the diffuser assembly; the connecting member is connected to the support member and the diffuser assembly, respectively;

wherein the support member comprises at least one support arm and a support connection; the at least one support arm is disposed on a side of the diffuser assembly close to the bracket body; the support connection is disposed on a side of the at least one support arm away from the diffuser assembly, and the support connection is connected to the at least one support arm and the bracket body, respectively;

wherein the support arm is recessed toward the output shaft;

wherein an end of the support arm away from the support connection is connected to the connecting member; and wherein, in the extension direction of the axis of the output shaft, a positive projection of the support arm overlaps with a positive projection of a connecting arm.

2. The electric fan according to claim 1, wherein a gap is defined between the stator-rotor component and the diffuser assembly in an extension direction of an axis of the output shaft.

3. The electric fan according to claim 2, wherein the diffuser assembly has an air outlet on an end close to the stator-rotor component; in the extension direction of the axis of the output shaft, a positive projection of the air outlet at least partially overlaps with a positive projection of the stator-rotor component.

4. The electric fan according to claim 3, wherein the stator-rotor component comprises a rotor and a stator;

the rotor is sleeved on the output shaft, and the stator is sleeved outside the rotor; in the extension direction of the axis of the output shaft, a positive projection of the air outlet at least partially overlaps with a positive projection of the stator.

5. The electric fan according to claim 4, wherein in the extension direction of the axis of the output shaft, the positive projection of the air outlet is a first projection, and the positive projection of the stator is a second projection; an area where the first projection and the second projection overlap is greater than or equal to half an area of a small projection; the small projection is one of the first projection and the second projection, and the area of the small projection is less than an area of the other of the first projection and the second projection.

6. The electric fan according to claim 1, wherein the at least one support arm is a plurality of support arms, and the plurality of support arms are distributed at equal intervals along a circumferential direction of the output shaft.

7. The electric fan according to claim 1, wherein the motor assembly further comprises a first bearing and a second bearing; the connecting member has a first bearing chamber, and the bracket body has a second bearing chamber;

the first bearing and the second bearing are both sleeved on the output shaft, with the first bearing being disposed in the first bearing chamber and the second bearing being disposed in the second bearing chamber.

8. The electric fan according to claim 7, wherein the motor assembly further comprises a plurality of elastic members;

a first group of the plurality of elastic members is arranged between the first bearing and an inner wall of the first bearing chamber and respectively abuts against the first bearing and the first bearing chamber; a second group of the plurality of elastic members is arranged between the second bearing and an inner wall of the second bearing chamber and respectively abut against the second bearing and the second bearing chamber.

9. The electric fan according to claim 3, wherein the electric fan further comprises a deflector, and a first end surface is formed on an end of the bracket adjacent to the diffuser assembly;

the deflector is arranged on the first end surface; in the extension direction of the axis of the output shaft, a positive projection of the deflector at least partially overlaps with the positive projection of the air outlet.

10. The electric fan according to claim 9, wherein the deflector comprises a deflection portion;

the deflection portion protrudes toward the air outlet; in the extension direction of the axis of the output shaft, a positive projection of a point on the deflection portion furthest from the first end surface is disposed within the positive projection of the air outlet;

wherein a surface of the deflection portion close to the air outlet is curved.

11. The electric fan according to claim 2, wherein the electric fan further comprises a mesh structure;

the mesh structure covers a gap between the diffuser assembly and the stator-rotor component, and the mesh structure is connected to the diffuser assembly and the bracket, respectively.

12. The electric fan according to claim 1, wherein the impeller assembly comprises an impeller assembly housing, a first impeller, a reflux component, and a second impeller;

the first impeller, the reflux component, and the second impeller are disposed in the impeller assembly housing; the first impeller, the reflux component, and the second impeller are sequentially sleeved on the output shaft; a first flow channel is included in the first impeller, a reflux channel is formed between the reflux component and an inner wall of the impeller assembly housing, and a second flow channel is included in the second impeller; the first flow channel, the reflux channel, and the second flow channel in a sequential communication with each other.

13. The electric fan according to claim 12, wherein the impeller assembly further comprises an elastic sealing ring, and the elastic sealing ring comprises a sealing ring body and an elastic sealing tooth;

each of the sealing ring body and the elastic sealing tooth has a ring-shaped structure, and both the sealing ring body and the elastic sealing tooth are sleeved on the output shaft; the sealing ring body is disposed between the reflux component and the elastic sealing tooth and is fixedly connected to the reflux component and the elastic sealing tooth, respectively; the elastic sealing tooth is rotatably connected to the output shaft; in an extension direction of an axis of the output shaft, a width of the elastic sealing tooth is positively correlated with a distance from the elastic sealing tooth to the axis of the output shaft.

14. The electric fan according to claim 12, wherein the impeller assembly further comprises a sealing cotton;

at least one of the following is satisfied:

the sealing cotton is filled between the impeller assembly housing and the first impeller; and the sealing cotton is filled between the impeller assembly housing and the second impeller.

15. The electric fan according to claim 1, wherein the diffuser assembly comprises a first axial flow diffuser and a second axial flow diffuser;

the first axial flow diffuser and the second axial flow diffuser are arranged along an extension direction of an axis of the output shaft; the first axial flow diffuser is sealed and connected to the second axial flow diffuser, and the first axial flow diffuser is in communication with the second axial flow diffuser; an end of the first axial flow diffuser away from the second axial flow diffuser is sealed and connected to the impeller assembly, and the first axial flow diffuser is in communication with the impeller assembly.

16. A terminal device, comprising an electric fan;

wherein the electric fan comprises a motor assembly, an impeller assembly, and a diffuser assembly; wherein the motor assembly comprises an output shaft, a bracket, and a stator-rotor component;

the bracket and the stator-rotor component are both sleeved on the output shaft; the bracket has an accommodation region, and the stator-rotor component is disposed in the accommodation region;

the impeller assembly is disposed on a side of the stator-rotor component and is sleeved on the output shaft;

the diffuser assembly is sleeved on the output shaft and is disposed between the stator-rotor component and the impeller assembly;

wherein a part of gas passing through the diffuser assembly is configured to flow toward an outside of the bracket, and another part of the gas is configured to flow toward an interior of the stator-rotor component;

wherein the bracket comprises a bracket body and a support member; the bracket body is sleeved on the output shaft; the support member is disposed on a side of the bracket body close to the diffuser assembly, and the support member is connected to the diffuser assembly and the bracket body, respectively;

wherein the motor assembly further comprises a connecting member; the connecting member is sleeved on the output shaft and is disposed on a side of the support member away from the bracket body; the connecting member is disposed on a radial inner side of the diffuser assembly; the connecting member is connected to the support member and the diffuser assembly, respectively;

wherein the support member comprises at least one support arm and a support connection; the at least one support arm is disposed on a side of the diffuser assembly close to the bracket body; the support connection is disposed on a side of the at least one support arm away from the diffuser assembly, and the support connection is connected to the at least one support arm and the bracket body, respectively;

wherein the support arm is recessed toward the output shaft;

wherein an end of the support arm away from the support connection is connected to the connecting member; and wherein, in the extension direction of the axis of the output shaft, a positive projection of the support arm overlaps with a positive projection of a connecting arm.

* * * * *